(12) United States Patent
Nemawarkar et al.

(10) Patent No.: US 7,103,823 B2
(45) Date of Patent: *Sep. 5, 2006

(54) COMMUNICATION BETWEEN MULTI-PROCESSOR CLUSTERS OF MULTI-CLUSTER COMPUTER SYSTEMS

(75) Inventors: Shashank Nemawarkar, Austin, TX (US); Rajesh Kota, Austin, TX (US); Guru Prasadh, Austin, TX (US); Carl Zeitler, Tomball, TX (US); David B. Glasco, Austin, TX (US)

(73) Assignee: Newisys, Inc., Austin, TX (US)

( * ) Notice: Subject to any disclaimer, the term of this patent is extended or adjusted under 35 U.S.C. 154(b) by 432 days.

This patent is subject to a terminal disclaimer.

(21) Appl. No.: 10/635,884

(22) Filed: Aug. 5, 2003

(65) Prior Publication Data

US 2005/0034049 A1  Feb. 10, 2005

(51) Int. Cl.
*H03M 13/00* (2006.01)
*G06F 11/00* (2006.01)

(52) U.S. Cl. ............................ 714/758; 714/799
(58) Field of Classification Search ............ 714/758, 714/799
See application file for complete search history.

(56) References Cited

U.S. PATENT DOCUMENTS

| | | | |
|---|---|---|---|
| 4,667,287 A | 5/1987 | Allen et al. | 709/234 |
| 5,166,674 A | 11/1992 | Baum et al. | 714/752 |
| 5,191,651 A | 3/1993 | Halim et al. | 709/250 |
| 5,197,130 A | 3/1993 | Chen et al. | 712/3 |
| 5,301,311 A | 4/1994 | Fushimi et al. | 714/23 |
| 5,371,852 A | 12/1994 | Attanasio et al. | 709/245 |
| 5,561,768 A | 10/1996 | Smith | 712/13 |
| 5,623,644 A | 4/1997 | Self et al. | 713/503 |
| 5,682,512 A | 10/1997 | Tetrick | 711/202 |
| 5,692,123 A | 11/1997 | Logghe | 714/48 |
| 5,819,075 A | 10/1998 | Forsmo | 713/401 |
| 5,931,938 A | 8/1999 | Drogichen et al. | 712/15 |
| 6,038,651 A * | 3/2000 | VanHuben et al. | 712/21 |

(Continued)

FOREIGN PATENT DOCUMENTS

EP  0978781  2/2000

(Continued)

OTHER PUBLICATIONS

*HyperTransport™ I/O Link Specification Revision 1.03*, HyperTransport™ Consortium, Oct. 10, 2001, Copyright © 2001 HyperTransport Technology Consortium.

(Continued)

*Primary Examiner*—Shelly Chase
(74) *Attorney, Agent, or Firm*—Beyer Weaver & Thomas LLP

(57) ABSTRACT

Improved techniques are provided for detecting and correcting errors and skew in inter-cluster communications within computer systems having a plurality of multi-processor clusters. The local nodes of each cluster include a plurality of processors and an interconnection controller. Intra-cluster links are formed between the local nodes, including the interconnection controller, within a cluster. Inter-cluster links are formed between interconnection controllers of different clusters. Intra-cluster packets may be serialized and encapsulated as inter-cluster packets for transmission on inter-cluster links, preferably with link-layer encapsulation. Each inter-cluster packet may include a sequence identifier and error information computed for that packet. Clock data may be embedded in symbols sent on each bit lane of the inter-cluster links. Copies of transmitted inter-cluster packets may be stored until an acknowledgement is received. The use of inter-cluster packets on an inter-cluster link is preferably transparent to other links and to the protocol layer.

30 Claims, 18 Drawing Sheets

U.S. PATENT DOCUMENTS

| | | | | |
|---|---|---|---|---|
| 6,047,332 | A | 4/2000 | Viswanathan et al. | 709/245 |
| 6,097,707 | A | 8/2000 | Hodzic et al. | 370/321 |
| 6,151,663 | A | 11/2000 | Pawlowski et al. | 711/147 |
| 6,167,492 | A | 12/2000 | Keller et al. | 711/154 |
| 6,219,775 | B1 | 4/2001 | Wade et al. | 712/11 |
| 6,226,671 | B1 | 5/2001 | Hagersten et al. | 709/215 |
| 6,256,671 | B1 | 7/2001 | Strentzsch et al. | 709/227 |
| 6,259,701 | B1 | 7/2001 | Shur et al. | 370/401 |
| 6,331,983 | B1 | 12/2001 | Haggerty et al. | 370/400 |
| 6,338,122 | B1 | 1/2002 | Baumgartner et al. | 711/141 |
| 6,349,091 | B1 | 2/2002 | Li | 370/238 |
| 6,370,585 | B1 | 4/2002 | Hagersten et al. | 709/238 |
| 6,377,640 | B1 | 4/2002 | Trans | 375/354 |
| 6,385,174 | B1 | 5/2002 | Li | 370/252 |
| 6,385,705 | B1 | 5/2002 | Keller et al. | 711/154 |
| 6,397,255 | B1 | 5/2002 | Nurenberg et al. | 455/13.3 |
| 6,463,529 | B1 | 10/2002 | Miller et al. | 713/2 |
| 6,467,007 | B1 | 10/2002 | Armstrong et al. | 710/260 |
| 6,490,661 | B1 | 12/2002 | Keller et al. | 711/150 |
| 6,578,071 | B1 | 6/2003 | Hagersten et al. | 709/245 |
| 6,687,751 | B1 | 2/2004 | Wils et al. | 709/203 |
| 6,690,757 | B1 | 2/2004 | Bunton et al. | 375/371 |
| 6,718,552 | B1 | 4/2004 | Goode | 725/95 |
| 6,760,819 | B1 | 7/2004 | Dhong et al. | 711/146 |
| 6,772,226 | B1 | 8/2004 | Bommareddy et al. | 709/245 |
| 6,826,660 | B1 | 11/2004 | Hagersten et al. | 711/153 |
| 6,847,993 | B1 | 1/2005 | Novaes et al. | 709/221 |
| 6,854,069 | B1* | 2/2005 | Kampe et al. | 714/4 |
| 6,856,621 | B1 | 2/2005 | Artes | 370/390 |
| 6,920,519 | B1 | 7/2005 | Beukema et al. | 710/306 |
| 2001/0014097 | A1 | 8/2001 | Beck et al. | 370/401 |
| 2001/0037435 | A1 | 11/2001 | Van Doren | 711/153 |
| 2002/0004915 | A1 | 1/2002 | Fung | 713/300 |
| 2002/0007463 | A1 | 1/2002 | Fung et al. | 713/300 |
| 2002/0156888 | A1 | 10/2002 | Lee et al. | 709/224 |
| 2003/0225909 | A1 | 12/2003 | Glasco et al. | 709/245 |
| 2003/0233388 | A1 | 12/2003 | Glasco et al. | 709/209 |
| 2004/0098475 | A1 | 5/2004 | Zeitler et al. | 709/223 |

FOREIGN PATENT DOCUMENTS

WO     WO 02/39242     5/2002

OTHER PUBLICATIONS

Copy of International Search Report dated Jul. 30, 2004, from PCT Application No. PCT/US2003/034687 9 pages.

D. E. Culler, J. P. Singh, A. Gupta, "Parallel Computer Architecture", 1999 Morgan Kaufmann, San Francisco, CA USA XP002277658.

Andrew Tanenbaum, "Computer Networks", Computer Networks, London: Prentice Hall International, GB, 1996, pp. 345-403, XP002155220.

U.S. Office Action mailed Sep. 21, 2005, from U.S. Appl. No. 10/157,384.

U.S. Office Action mailed Jan. 30, 2006, from U.S. Appl. No. 10/157,384.

U.S. Office Action mailed Oct. 20, 2005, from U.S. Appl. No. 10/156,893.

U.S. Office Action mailed Feb. 2, 2006, from U.S. Appl. No. 10/635,705.

U.S. Office Action mailed Nov. 15, 2005, from U.S. Appl. No. 10/635,793.

* cited by examiner

|  |  | Local Table | | Global Table | | | |
|---|---|---|---|---|---|---|---|
|  |  | Dest Node | | Dest Cluster | | | |
| Source | | $N_0$ | $N_1$ | $C_0$ | $C_1$ | $C_2$ | $C_3$ |
| Cluster 0 | Node 0 | X | $L_0$ | NA | NA | NA | NA |
|  | Node 1 | $L_0$ | X | X | $L_1$ | $L_2$ | $L_1$ |
| Cluster 1 | Node 0 | X | $L_0$ | NA | NA | NA | NA |
|  | Node 1 | $L_0$ | X | $L_1$ | X | $L_2$ | $L_2$ |
| Cluster 2 | Node 0 | X | $L_0$ | NA | NA | NA | NA |
|  | Node 1 | $L_0$ | X | $L_2$ | $L_2$ | X | $L_1$ |
| Cluster 3 | Node 0 | X | $L_0$ | NA | NA | NA | NA |
|  | Node 1 | $L_0$ | X | $L_2$ | $L_2$ | $L_1$ | X |

| 32b HT packet | 32 b ACK/NACK packet | 6b SeqID | 2b PT | 12b Remote bits | 12b CRC12 |
|---|---|---|---|---|---|

Fig 13A: Protocol Packet- 32b Control

| 32b (31:0) HT packet | 32 b (63:32) HT packet | 6b SeqID | 2b PT | 12b Remote bits | 12b CRC12 |
|---|---|---|---|---|---|

Fig 13B: Protocol Packet- 64b Control.

| 32b Data | 32 b unused | 6b SeqID | 2b PT | 8b Packet length | 16b CRC16 |
|---|---|---|---|---|---|

Fig. 13C: Data Packet- 32b.

| 32b (31:0) Data | 32 b (63:32) Data | 6b SeqID | 2b PT | 8b Packet length | 16b CRC16 |
|---|---|---|---|---|---|

Fig. 13D: Data Packet- 64b.

| 32b (31:0) Data | 32 b (63:32) Data | 6b SeqID | 2b PT | 8b Packet length | 16 b unused |
|---|---|---|---|---|---|
| 32b (95:64) Data | 32 b unused | 16b unused | | | 16b CRC16 |

Fig 13E: Data Packet- 96b.

| 32b (31:0) Data | 32 b (63:32) Data | 6b SeqID | 2b PT | 8b Packet length | 16 b unused |
|---|---|---|---|---|---|
| 32b (95:64) Data | 32b (127:96) Data | 16b unused | | | 16b CRC16 |

Fig 13F: Data Packet- 128b.

| 32b (31:0) Data | 32 b (63:32) Data | 6b SeqID | 2b PT | 8b Packet length | 16 b unused |
|---|---|---|---|---|---|
| 32b (95:64) Data | 32b (127:96) Data | 32 b (159:128) Data ||||
| 32 b unused | 32 b unused | 16b unused || 16b CRC16 ||

Fig 13G: Data Packet- 160b.

| 32b (31:0) Data | 32 b (63:32) Data | 6b SeqID | 2b PT | 8b Packet length | 16 b unused |
|---|---|---|---|---|---|
| 32b (95:64) Data | 32b (127:96) Data | 32 b (159:128) Data ||||
| 32 b (191:160) Data | 32 b unused | 16 b unused || 16b CRC16 ||

Fig 13H: Data Packet- 192b.

| 32b (31:0) Data | 32 b (63:32) Data | 6b SeqID | 2b PT | 8b Packet length | 16 b unused |
|---|---|---|---|---|---|
| 32b (95:64) Data | 32b (127:96) Data | 32 b (159:128) Data ||||
| 32b (191:160) Data | 32b (223:192) Data | 32 b (255:224) Data ||||
| 32b (303:272) Data | 32b (335:304) Data | 32 b (367:336) Data ||||
| 32b (383:368) Data | 32b (415:384) Data | 32 b (447:416) Data ||||
| 32b (479:448) Data | 32b (511:480) Data | 16 b unused || 16b CRC16 ||

Fig 13I: Data Packet- 512b.

| Command | 8b Rsv | 8b Rsv | 1b Rsv | SeqID | 1b Valid |
|---|---|---|---|---|---|

Fig 13J: ACK/NACK Packet Format.

COMMUNICATION BETWEEN MULTI-PROCESSOR CLUSTERS OF MULTI-CLUSTER COMPUTER SYSTEMS

CROSS-REFERENCES TO RELATED APPLICATIONS

This application is related to U.S. patent application Ser. No. 10/635,705, filed the same day as this application, U.S. patent application Ser. No. 10/635,744, filed the same day as this application, U.S. patent application Ser. No. 10/635,793, filed the same day as this application, U.S. patent application Ser. No. 10/602,280, entitled "Improving Bandwidth, Framing and Error Detection in Communications Between Multi-Processor Clusters of Multi-Cluster Computer Systems," filed Jun. 23, 2003, and to U.S. patent application Ser. Nos. 10/157,384 and 10/156,893, both of which were filed on May 28, 2002. All of the foregoing applications are hereby incorporated by reference.

BACKGROUND OF THE INVENTION

The present invention relates generally to multi-processor computer systems. More specifically, the present invention provides techniques for sending signals between clusters of computer systems having a plurality of multi-processor clusters.

A relatively new approach to the design of multi-processor systems replaces broadcast communication such as bus or ring architectures among processors with a point-to-point data transfer mechanism in which the processors communicate similarly to network nodes in a tightly-coupled computing system. That is, the processors are interconnected via a plurality of communication links and requests are transferred among the processors over the links according to routing tables associated with each processor. The intent is to increase the amount of information transmitted within a multi-processor platform per unit time.

In some multi-processor systems, local nodes (including processors and an interconnection controller) are directly connected to each other through a plurality of point-to-point intra-cluster links to form a cluster of processors. Separate clusters of processors can be connected via point-to-point inter-cluster links. The point-to-point links significantly increase the bandwidth for coprocessing and multiprocessing functions. However, using a point-to-point architecture to connect multiple processors in a multiple cluster system presents its own problems.

One limitation associated with such an architecture is caused by the inter-cluster links used to transmit signals between clusters. Inter-cluster links are relatively longer than intra-cluster links. Inter-cluster links pick up relatively more noise and therefore tend to include more errors than signals transmitted on intra-cluster links.

In addition, the extra length of inter-cluster links exacerbates the effect of skew between bit lanes. A typical intra-cluster link initialization sequence essentially indicates the device types at each end of a link and when each device will start sending data. Accordingly, this initialization sequence does not provide sufficient information to calibrate the linked devices for de-skewing.

Consequently, skew and error detection and correction methods that may be acceptable for intra-cluster links are not always adequate for inter-cluster links. Therefore, it would be desirable to provide techniques for improving skew and error detection and correction in systems having multiple clusters of multiple processors connected using point-to-point links.

SUMMARY OF THE INVENTION

According to the present invention, improved techniques are provided for detecting and correcting errors and skew in inter-cluster communications within computer systems having a plurality of multi-processor clusters.

The local nodes of each cluster include a plurality of processors and an interconnection controller. Intra-cluster links are formed between the local nodes, including the interconnection controller, within a cluster. Inter-cluster links are formed between interconnection controllers of different clusters.

Intra-cluster packets may be encapsulated as inter-cluster packets and serialized for transmission on inter-cluster links, preferably with link-layer encapsulation. Each inter-cluster packet may include a sequence identifier and error information computed for that packet. Clock data may be embedded in symbols sent on each bit lane of the inter-cluster links. Copies of transmitted inter-cluster packets may be stored until an acknowledgement is received. The use of inter-cluster packets on an inter-cluster link is preferably transparent to other links and to the protocol layer.

Some embodiments of the invention provide a computer system including a plurality of processor clusters interconnected by a plurality of point-to-point inter-cluster links, each processor cluster comprising nodes including a plurality of local processors and an interconnection controller interconnected by a plurality of point-to-point intra-cluster links, communications within a cluster being made via an intra-cluster protocol that uses intra-cluster packets, wherein the interconnection controller in each cluster is operable to map locally-generated communications directed to others of the clusters to the point-to-point inter-cluster links and to map remotely-generated communications directed to the local nodes to the point-to-point intra-cluster links, communications between clusters being made via an inter-cluster protocol that uses inter-cluster packets, an inter-cluster packet encapsulating at least one intra-cluster packet, each interconnection controller configured to compute a first cyclic redundancy code check for, and to encode first cyclic redundancy code check data in, each inter-cluster packet transmitted on the point-to-point inter-cluster links.

Each interconnection controller may be further configured to compute a second cyclic redundancy code check for each inter-cluster packet received on the point-to-point inter-cluster links. Each interconnection controller may be further configured to transmit each inter-cluster packet as an indivisible unit on the point-to-point inter-cluster links. Each interconnection controller may be further configured to encode a sequence identifier in each inter-cluster packet transmitted on the point-to-point inter-cluster links.

The nodes may be configured to compute a cyclic redundancy code check on a transmission window that includes transmissions of multiple intra-cluster packets on the point-to-point intra-cluster links. Each interconnection controller may be further configured to compute a cyclic redundancy code check on a transmission window that includes transmissions of multiple intra-cluster packets on the point-to-point intra-cluster links. Each interconnection controller may encode the cyclic redundancy code check data in a field reserved for a link layer of each inter-cluster packet transmitted on the point-to-point inter-cluster links.

Alternative embodiments of the invention provide a computer system. The computer system includes a first cluster including a first plurality of processors and a first interconnection controller, the first plurality of processors and the first interconnection controller interconnected by first point-to-point intra-cluster links. The computer system also includes a second cluster including a second plurality of processors and a second interconnection controller, the second plurality of processors and the second interconnection controller interconnected by second point-to-point intra-cluster links. The first interconnection controller is coupled to the second interconnection controller by point-to-point inter-cluster links. The first interconnection controller is configured to: receive a request according to an intra-cluster protocol from a first processor in the first plurality of processors; generate a probe packet responsive to the request; compute a first cyclic redundancy code check based only upon bits in the probe packet; encode first cyclic redundancy code check data in the probe packet; and send the probe packet to the second interconnection controller in the second cluster. As used herein, the terms "probe packet," "request packet," "response packet," etc., are generic and are not limited to any particular protocol.

The first interconnection controller may be further configured to encode a sequence identifier in the probe packet. The second interconnection controller may be configured to compute a second cyclic redundancy code check based only upon bits in the first probe packet.

The second interconnection controller may be configured to forward the probe packet according to the intra-cluster protocol to a processor in the second plurality of processors. The processor in the second plurality of processors may be configured to send a response packet according to the intra-cluster protocol to the second interconnection controller.

The second interconnection controller may be configured to forward the probe packet according to the intra-cluster protocol to each processor in the second plurality of processors. Each processor in the second plurality of processors may be configured to send a response packet according to the intra-cluster protocol to the second interconnection controller.

Alternative embodiments of the invention provide an interconnection controller having an intra-cluster interface, an inter-cluster interface, a transceiver and a serializer/deserializer. The intra-cluster interface is configured for coupling with intra-cluster links to a plurality of local processors arranged in a point-to-point architecture in a local cluster. The inter-cluster interface is configured for coupling with an inter-cluster link to a non-local interconnection controller in a non-local cluster. The transceiver is configured to receive an intra-cluster packet from the local processors via the intra-cluster links and encode a sequence identifier in the packet. The serializer/deserializer is configured to serialize the encoded packet and forward the encoded, serialized packet to the inter-cluster interface for transmission to the non-local interconnection controller via an inter-cluster link.

The interconnection controller may be configured to compute a cyclic redundancy code check based only on the encoded, serialized packet. The transceiver may be further configured to encode the cyclic redundancy code check in the encoded, serialized packet.

The inter-cluster interface may be further configured to receive encoded, serialized packets from the non-local interconnection controller. The serializer/deserializer may be further configured to deserialize the encoded, serialized packets. The transceiver may be further configured to perform a cyclic redundancy code check on the deserialized packets.

An integrated circuit may include the interconnection controller. The integrated circuit may be an application-specific integrated circuit. A set of semiconductor processing masks may represent at least a portion of the interconnection controller.

At least one computer-readable medium having data structures stored therein may represent the interconnection controller. The data structures may include a simulatable representation of the interconnection controller. The simulatable representation may include a netlist. The data structures may include a code description of the interconnection controller. The code description may correspond to a hardware description language.

Some aspects of the invention provide a computer-implemented method for detecting errors in a computer system comprising a plurality of clusters, each cluster including a plurality of local nodes and an interconnection controller interconnected by point-to-point intra-cluster links, communications between the local nodes and the interconnection controller made via an intra-cluster protocol using intra-cluster packets, the interconnection controller of each cluster interconnected by point-to-point inter-cluster links with the interconnection controller of other clusters. The computer-implemented method includes the following steps: forming an inter-cluster packet by encapsulating an intra-cluster packet; encoding a sequence identifier in the inter-cluster packet; calculating first cyclic redundancy code check data based only upon the inter-cluster packet; encoding the first cyclic redundancy code check data in the inter-cluster packet; and transmitting the inter-cluster packet from a first interconnection controller to a second interconnection controller on a point-to-point inter-cluster link. The encoding steps may include encoding in an area of the inter-cluster packet reserved for link layer information.

The computer-implemented method may also include the following steps: receiving the inter-cluster packet; and calculating second cyclic redundancy code check data based only upon the inter-cluster packet. The computer-implemented method may include the steps of: detecting an error in the inter-cluster packet based upon the second cyclic redundancy code check data; and notifying the first interconnection controller of the error.

Some embodiments of the invention provide an apparatus for detecting errors in a computer system comprising a plurality of clusters, each cluster including a plurality of local nodes and an interconnection controller interconnected by point-to-point intra-cluster links, communications between the local nodes and the interconnection controller made via an intra-cluster protocol using intra-cluster packets, the interconnection controller of each cluster interconnected by point-to-point inter-cluster links with the interconnection controller of other clusters. The apparatus includes: a device for forming an inter-cluster packet by encapsulating an intra-cluster packet; a device for encoding a sequence identifier in the inter-cluster packet; a device for calculating first cyclic redundancy code check data based only upon the inter-cluster packet; a device for encoding the first cyclic redundancy code check data in the inter-cluster packet; and a device for transmitting the inter-cluster packet from a first interconnection controller to a second interconnection controller on a point-to-point inter-cluster link.

Alternative embodiments of the invention provide a computer system. The computer system includes: a first cluster including a first plurality of processors and a first interconnection controller, the first plurality of processors and the first interconnection controller interconnected by first point-to-point intra-cluster links; and a second cluster including a second plurality of processors and a second interconnection controller, the second plurality of processors and the second interconnection controller interconnected by second point-to-point intra-cluster links, the first interconnection controller coupled to the second interconnection controller by point-to-point inter-cluster links, communications on the first and second intra-cluster links made via an intra-cluster protocol by intra-cluster packets.

The first interconnection controller is configured to: receive an intra-cluster packet from a first processor in the first plurality of processors; store the intra-cluster packet in a buffer; add a header, including a sequence identifier, to the intra-cluster packet to form a high-speed link packet; compute a first cyclic redundancy code check based only upon the high-speed link packet; encode first cyclic redundancy code check data in the high-speed link packet; and transmit the high-speed link packet to the second interconnection controller in the second cluster.

The second interconnection controller is configured to: receive the high-speed link packet; compute a second cyclic redundancy code check based only upon the high-speed link packet; compare results of the second cyclic redundancy code check with the encoded first cyclic redundancy code check data in the high-speed link packet; and notify the first interconnection controller regarding the results of the comparison.

The second interconnection controller may be further configured to detect a gap in sequence identifiers of high-speed link packets received from the first interconnection controller. The notifying step may include notifying the first interconnection controller of the gap. The notifying step may involve initiating a retry sequence when a gap is detected, the retry sequence causing the first interconnection controller to transmit high-speed link packets that include copies of intra-cluster packets stored in the buffer.

The notifying step may include sending an acknowledgement or "ACK" packet to the first interconnection controller, indicating that a sequence identifier of one or more high-speed link packets received without errors. The first interconnection controller may be configured to purge intra-cluster packets stored in the buffer that correspond to the sequence identifiers of the ACK packets.

The notifying step may involve sending a negative acknowledgment or "NACK" packet to the first interconnection controller indicating a sequence identifier of one or more high-speed link packets received with errors. The notifying step may involve initiating a retry sequence when an error is detected in the comparing step, the retry sequence causing the first interconnection controller to transmit high-speed link packets that include copies of intra-cluster packets stored in the buffer.

Yet other embodiments of the invention provide a computer system, including: a first cluster including a first plurality of processors and a first interconnection controller, the first plurality of processors and the first interconnection controller interconnected by first point-to-point intra-cluster links; and a second cluster including a second plurality of processors and a second interconnection controller, the second plurality of processors and the second interconnection controller interconnected by second point-to-point intra-cluster links, the first interconnection controller coupled to the second interconnection controller by point-to-point inter-cluster links.

The first and second interconnection controllers are configured to: perform an initialization sequence that establishes a characteristic skew pattern between data lanes of the point-to-point inter-cluster links; encode clock data in each symbol transmitted on the point-to-point inter-cluster links; recover clock data from each symbol received on the point-to-point inter-cluster links; and apply the characteristic skew pattern to correct for skew between data lanes of the point-to-point inter-cluster links.

The encoding step may involve encoding 8-bit symbols as 10-bit symbols. The encoding step may include encoding 4-bit symbols as 5-bit symbols.

The initialization sequence may involve the use of one or more training sequences having known structures and lengths. For example, he initialization sequence may include the use of training sequences such as TS1 and TS2 of the InfiniBand™ protocol, initialization sequences similar to those of the PCI Express or Serial SCSI architectures, or other such sequences. The initialization sequence may establish a phase lock loop for incoming frequency-encoded data.

Other embodiments of the invention provide an interconnection controller, including an intra-cluster interface, an inter-cluster interface, a transceiver and a serializer/deserializer. The intra-cluster interface is configured for coupling with intra-cluster links to a plurality of local processors arranged in a point-to-point architecture in a local cluster. The inter-cluster interface is configured for coupling with an inter-cluster link to a non-local interconnection controller in a non-local cluster. The transceiver is configured to: receive an intra-cluster packet from the local processors via the intra-cluster interface and encapsulate the intra-cluster packet as a high-speed link packet by adding a sequence identifier and a packet type identifier to the intra-cluster packet. The serializer/deserializer is configured to serialize the high-speed link packet and forward the high-speed link packet to the inter-cluster interface for transmission to the non-local interconnection controller via an inter-cluster link.

The interconnection controller may be further configured to compute a cyclic redundancy code check based only on the high-speed link packet and the serializer/deserializer may be further configured to encode the cyclic redundancy code check in the high-speed link packet.

The inter-cluster interface may be further configured to receive high-speed link packets from the non-local interconnection controller and the serializer/deserializer may be further configured to deserialize the encoded, serialized packets. The transceiver may be further configured to perform a cyclic redundancy code check on the deserialized packets.

The sequence identifier and the packet type identifier may be encoded in a header of the high-speed link packet. The sequence identifier and the packet type identifier may be encoded in a portion of the high-speed link packet reserved for link-layer encoding.

The transceiver may be configured to encode a packet length field in a header of the high-speed link packet. The transceiver may be further configured to encapsulate both an intra-cluster packet and an ACK packet in a single high-speed link packet. The transceiver may be further configured to form high-speed link packets having lengths that are integral multiples of 96 bits. The transceiver may be further configured to form high-speed link packets that are transparent to a protocol layer.

An integrated circuit may include the interconnection controller. The integrated circuit may be an application-specific integrated circuit. A set of semiconductor processing masks may be representative of at least a portion of the interconnection controller.

At least one computer-readable medium having data structures stored therein may be representative of the interconnection controller. The data structures may include a simulatable representation of the interconnection controller. The simulatable representation may include a netlist. The data structures may include a code description of the interconnection controller. The code description may correspond to a hardware description language.

A further understanding of the nature and advantages of the present invention may be realized by reference to the remaining portions of the specification and the drawings.

BRIEF DESCRIPTION OF THE DRAWINGS

FIGS. 13A through 13J illustrate examples of formats for packets sent on an inter-cluster link.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Multi-processor architectures having point-to-point communication among their processors are suitable for implementing specific embodiments of the present invention. In the following description, numerous specific details are set forth in order to provide a thorough understanding of the present invention. The present invention may be practiced without some or all of these specific details. Well known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Figure 1A:
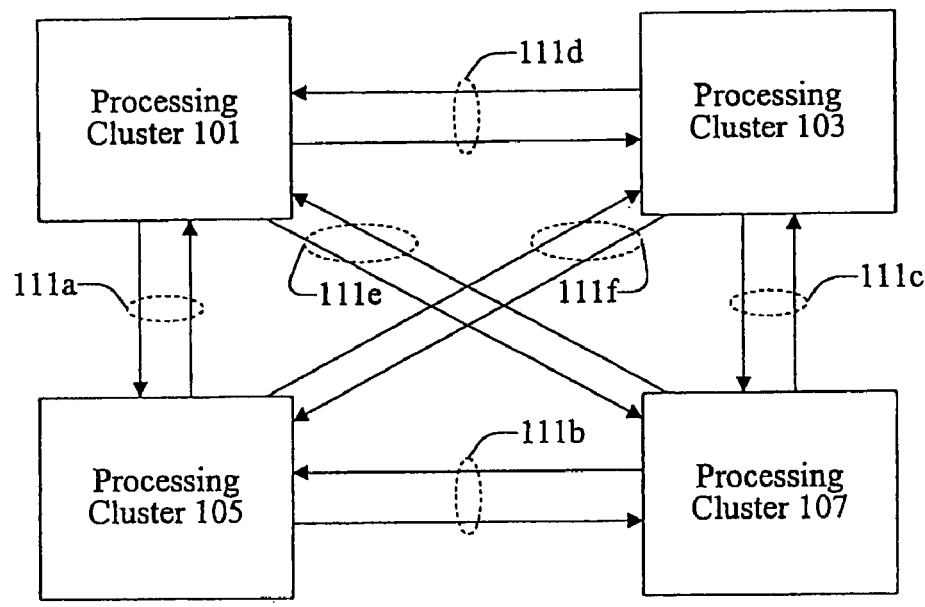
FIGS. 1A and 1B are diagrammatic representations depicting systems having multiple clusters.

FIG. 1A is a diagrammatic representation of one example of a multiple cluster, multiple processor system which may employ the techniques of the present invention. Each processing cluster 101, 103, 105, and 107 includes a plurality of processors. The processing clusters 101, 103, 105, and 107 are connected to each other through point-to-point inter-cluster links 111a–f. The multiple processors in the multiple cluster architecture shown in FIG. 1A share a global memory space. In this example, the point-to-point inter-cluster links 111a–f are internal system connections that are used in place of a traditional front-side bus to connect the multiple processors in the multiple clusters 101, 103, 105, and 107.

Figure 1B:
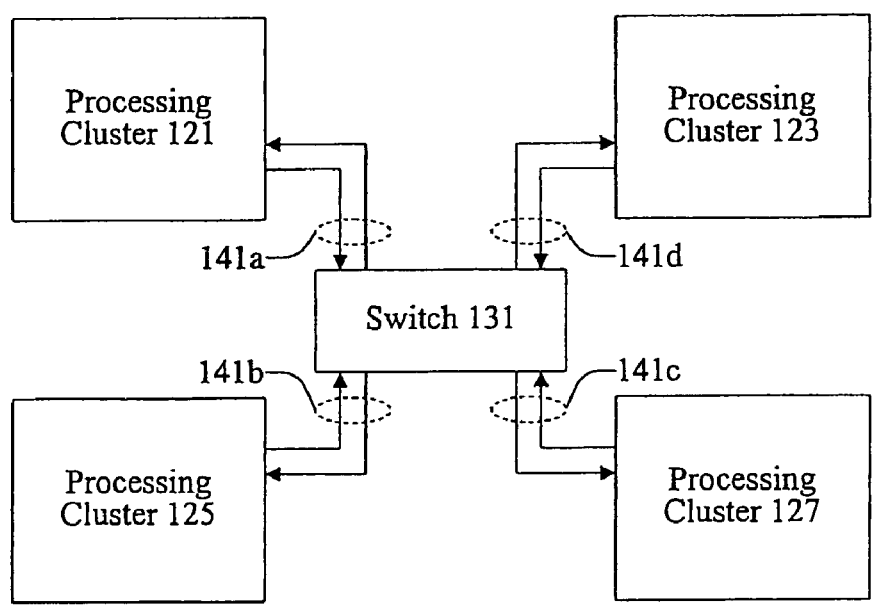

FIG. 1B is a diagrammatic representation of another example of a multiple cluster, multiple processor system that may employ the techniques of the present invention. Each processing cluster 121, 123, 125, and 127 is coupled to a switch 131 through point-to-point links 141a–d. It should be noted that using a switch and point-to-point links allows implementation with fewer point-to-point links when connecting multiple clusters in the system. A switch 131 can include a general purpose processor with a coherence protocol interface. According to various implementations, a multi-cluster system shown in FIG. 1A may be expanded using a switch 131 as shown in FIG. 1B.

Figure 2:
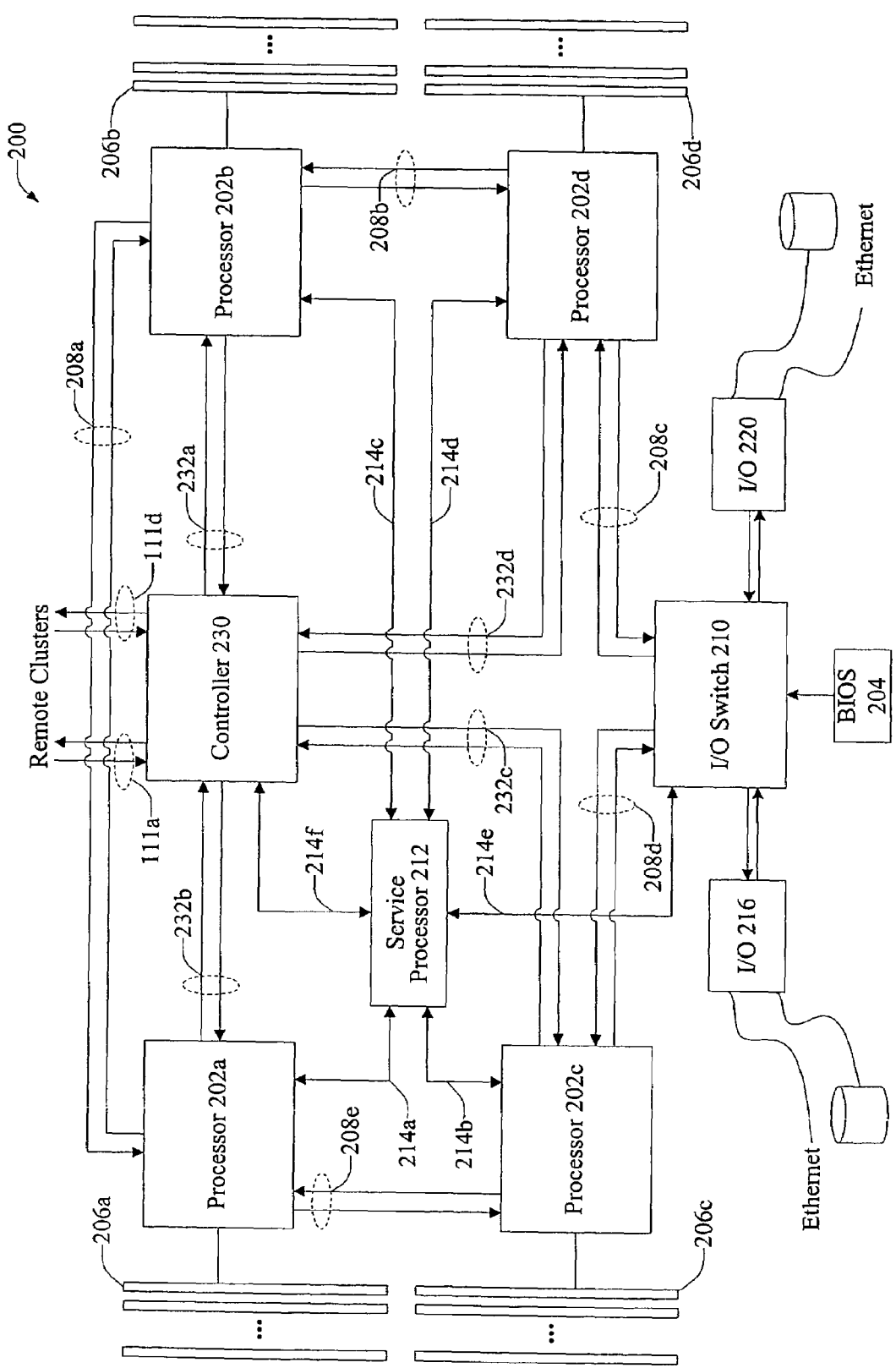
FIG. 2 is a diagrammatic representation of an exemplary cluster having a plurality of processors for use with specific embodiments of the present invention.

FIG. 2 is a diagrammatic representation of a multiple processor cluster such as, for example, cluster 101 shown in FIG. 1A. Cluster 200 includes processors 202a–202d, one or more Basic I/O systems (BIOS) 204, a memory subsystem comprising memory banks 206a–206d, point-to-point communication links 208a–208e, and a service processor 212. The point-to-point communication links are configured to allow interconnections between processors 202a–202d, I/O switch 210, and interconnection controller 230. The service processor 212 is configured to allow communications with processors 202a–202d, I/O switch 210, and interconnection controller 230 via a JTAG interface represented in FIG. 2 by links 214a–214f. It should be noted that other interfaces are supported. I/O switch 210 connects the rest of the system to I/O adapters 216 and 220, and to BIOS 204 for booting purposes.

According to specific embodiments, the service processor of the present invention has the intelligence to partition system resources according to a previously specified partitioning schema. The partitioning can be achieved through direct manipulation of routing tables associated with the system processors by the service processor which is made possible by the point-to-point communication infrastructure. The routing tables can also be changed by execution of the BIOS code in one or more processors. The routing tables are used to control and isolate various system resources, the connections between which are defined therein.

The processors 202a–d are also coupled to an interconnection controller 230 through point-to-point intra-cluster links 232a–d. According to various embodiments and as will be described below in greater detail, interconnection controller 230 performs a variety of functions which enable the number of interconnected processors in the system to exceed the node ID space and mapping table limitations associated with each of a plurality of processor clusters. According to some embodiments, interconnection controller 230 performs a variety of other functions including the maintaining of cache coherency across clusters.

Interconnection controller 230 can be coupled to similar controllers associated with other multiprocessor clusters via inter-cluster links, such as inter-cluster links 111a and 111d. It should be noted that there can be more than one such interconnection controller in one cluster. Interconnection controller 230 communicates with both processors 202a–d as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of cluster 200 will be assumed. For example, most of the resources shown in FIG. 2 are assumed to reside on a single electronic assembly. In addition, memory banks 206a–206d may comprise double data rate (DDR) memory that is physically provided as dual in-line memory modules (DIMMs). I/O adapter 216 may be, for example, an ultra direct memory access (UDMA) controller or a small computer system interface (SCSI) controller that provides access to a permanent storage device. I/O adapter 220 may be an Ethernet card adapted to provide communications with a network such as, for example, a local area network (LAN) or the Internet. BIOS 204 may be any persistent memory like flash memory.

According to one embodiment, service processor 212 is a Motorola MPC855T microprocessor that includes integrated chipset functions, and interconnection controller 230 is an Application Specific Integrated Circuit (ASIC) supporting the local point-to-point coherence protocol. Interconnection controller 230 can also be configured to handle a non-coherent protocol to allow communication with I/O devices. In one embodiment, interconnection controller 230 is a specially configured programmable chip such as a programmable logic device or a field programmable gate array. In another embodiment, the interconnect controller 230 is an Application Specific Integrated Circuit (ASIC). In yet another embodiment, the interconnect controller 230 is a general purpose processor augmented with an ability to access and process interconnect packet traffic.

Figure 3:
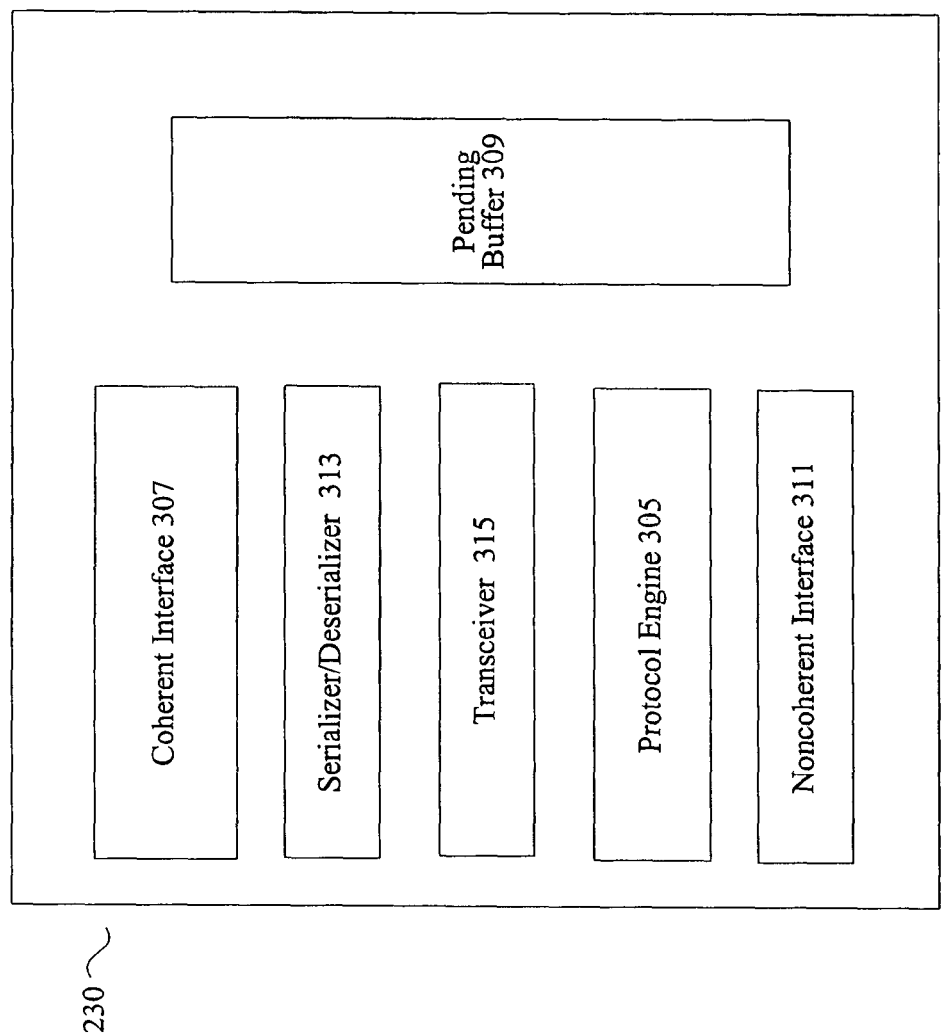
FIG. 3 is a diagrammatic representation of an exemplary interconnection controller for facilitating various embodiments of the present invention.

FIG. 3 is a diagrammatic representation of one example of an interconnection controller 230 for facilitating various aspects of the present invention. According to various embodiments, the interconnection controller includes a protocol engine 305 configured to handle packets such as probes and requests received from processors in various clusters of a multiprocessor system. The functionality of the protocol engine 305 can be partitioned across several engines to improve performance. In one example, partitioning is done based on packet type (request, probe and response), direction (incoming and outgoing), or transaction flow (request flows, probe flows, etc).

The protocol engine 305 has access to a pending buffer 309 that allows the interconnection controller to track transactions such as recent requests and probes and associate the transactions with specific processors. Transaction information maintained in the pending buffer 309 can include transaction destination nodes, the addresses of requests for subsequent collision detection and protocol optimizations, response information, tags, and state information. As will become clear, this functionality is leveraged to enable particular aspects of the present invention.

The interconnection controller has a coherent protocol interface 307 having an intra-cluster interface that allows the interconnection controller to communicate with other processors in the cluster via intra-cluster links such as 232a–232d of FIG. 2. Coherent protocol interface 307 also includes an inter-cluster interface that allows interconnection controller 230 to communicate with external processor clusters via, for example, links 111a–111f of FIGS. 1A and 1B. The interconnection controller may also include other interfaces such as a non-coherent protocol interface 311 for communicating with I/O devices (e.g., as represented in FIG. 2 by links 208c and 208d). According to various embodiments, each interface 307 and 311 is implemented either as a full crossbar or as separate receive and transmit units using components such as multiplexers and buffers. It should be noted that the interconnection controller 230 does not necessarily need to provide both coherent and non-coherent interfaces.

In this embodiment, interconnection controller 230 includes serializer/deserializer 313 and transceiver 315, both of which will be described in detail below. According to some embodiments, transceiver 315performs, or assists in the performance of, many of the methods of the present invention. According to some implementations of the invention, before a packet from a local processor is forwarded to an interconnection controller in another cluster, transceiver 315 processes the packet. The processing may include adding a packet header and adding cyclic redundancy code check information, as will be described in detail below. Serializer/deserializer 313 serializes packets to be sent on an inter-cluster link and deserializes packets received from an inter-cluster link. Serializer/deserializer 313 preferably performs 8b/10b encoding and 10b/8b decoding (or comparable encoding and decoding). In other embodiments of the invention, other components of interconnection controller 230 and/or cluster 200 perform some or all of the functions performed by serializer/deserializer 313 and transceiver 315. For example, the functions of serializer/deserializer 313 and transceiver 315 may be divided between a serializer, a deserializer, a transmitter and a receiver.

Figure 4:
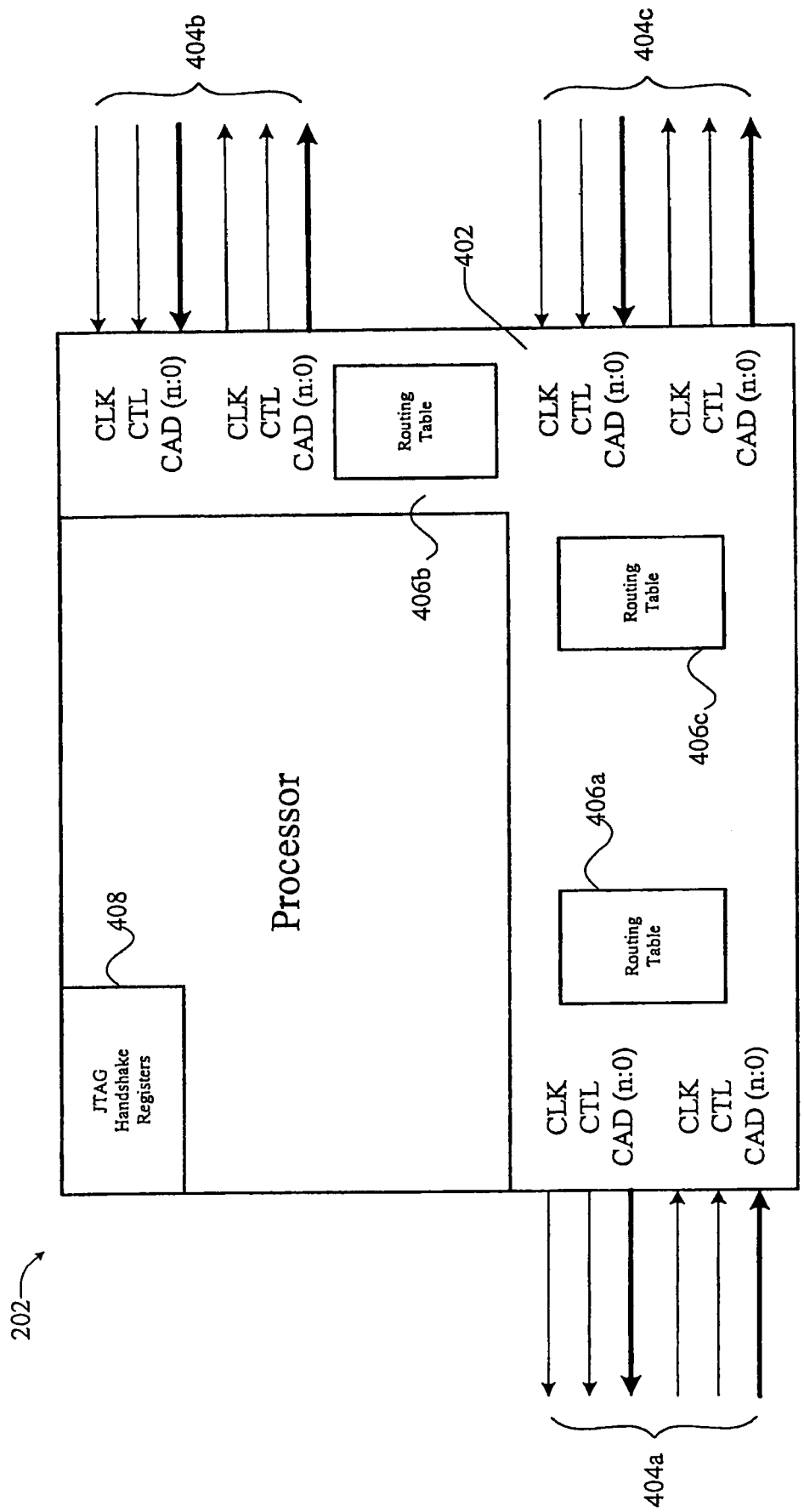
FIG. 4 is a diagrammatic representation of a local processor for use with various embodiments of the present invention.

According to various embodiments of the invention, processors 202a–202d are substantially identical. FIG. 4 is a simplified block diagram of such a processor 202 that includes an interface 402 having a plurality of ports 404a–404c and routing tables 406a–406c associated therewith. Each port 404 allows communication with other resources, e.g., processors or I/O devices, in the computer system via associated links, e.g., links 208a–208e of FIG. 2.

The infrastructure shown in FIG. 4 can be generalized as a point-to-point, distributed routing mechanism which comprises a plurality of segments interconnecting the systems processors according to any of a variety of topologies, e.g., ring, mesh, etc. Each of the endpoints of each of the segments is associated with a connected processor that has a unique node ID and a plurality of associated resources that it "owns," e.g., the memory and I/O to which it's connected.

The routing tables associated with each of the nodes in the distributed routing mechanism collectively represent the current state of interconnection among the computer system resources. Each of the resources (e.g., a specific memory range or I/O device) owned by any given node (e.g., processor) is represented in the routing table(s) associated with the node as an address. When a request arrives at a node, the requested address is compared to a two level entry in the node's routing table identifying the appropriate node and link, i.e., given a particular address within a range of addresses, go to node x; and for node x use link y.

As shown in FIG. 4, processor 202 can conduct point-to-point communication with three other processors according to the information in the associated routing tables. According to a specific embodiment, routing tables 406a–406c comprise two-level tables, a first level associating the unique addresses of system resources (e.g., a memory bank) with a corresponding node (e.g., one of the processors), and a second level associating each node with the link (e.g., 208a–208e) to be used to reach the node from the current node.

Processor 202 also has a set of JTAG handshake registers 408 which, among other things, facilitate communication between the service processor (e.g., service processor 212 of FIG. 2) and processor 202. That is, the service processor can write routing table entries to handshake registers 408 for eventual storage in routing tables 406a–406c. It should be understood that the processor architecture depicted in FIG. 4 is merely exemplary for the purpose of describing a specific embodiment of the present invention. For example, a fewer or greater number of ports and/or routing tables may be used to implement other embodiments of the invention.

As mentioned above, the basic protocol upon which the clusters in specific embodiments of the invention are based provides for a limited node ID space which, according to a particular implementation, is a 3-bit space, therefore allowing for the unique identification of only 8 nodes. That is, if this basic protocol is employed without the innovations represented by the present invention, only 8 nodes may be interconnected in a single cluster via the point-to-point infrastructure. To get around this limitation, the present invention introduces a hierarchical mechanism that preserves the single-layer identification scheme within particular clusters while enabling interconnection with and communication between other similarly situated clusters and processing nodes.

According to a specific embodiment, one of the nodes in each multi-processor cluster is an interconnection controller, e.g., interconnection controller 230 of FIG. 2, which manages the hierarchical mapping of information thereby enabling multiple clusters to share a single memory address space while simultaneously allowing the processors within its cluster to operate and to interact with any processor in any cluster without "knowledge" of anything outside of their own cluster. The interconnection controller appears to its associated processor to be just another one of the processors or nodes in the cluster.

In the basic protocol, when a particular processor in a cluster generates a request, a set of address mapping tables are employed to map the request to one of the other nodes in the cluster. That is, each node in a cluster has a portion of a shared memory space with which it is associated. There are different types of address mapping tables for main memory, memory-mapped I/O, different types of I/O space, etc. These address mapping tables map the address identified in the request to a particular node in the cluster.

A set of routing tables is then employed to determine how to get from the requesting node to the node identified from the address mapping table. That is, as discussed above, each processor (i.e., cluster node) has associated routing tables that identify a particular link in the point-to-point infrastructure that may be used to transmit the request from the current node to the node identified from the address mapping tables. Although generally a node may correspond to one or a plurality of resources (including, for example, a processor), it should be noted that the terms node and processor are often used interchangeably herein. According to a particular implementation, a node comprises multiple sub-units, e.g., CPUs, memory controllers, I/O bridges, etc., each of which has a unit ID.

In addition, because individual transactions may be segmented in non-consecutive packets, each packet includes a unique transaction tag to identify the transaction with which the packet is associated with reference to the node that initiated the transaction. According to a specific implementation, a transaction tag identifies the source node (3-bit field), the source node unit (2-bit field), and a transaction ID (5-bit field).

Thus, when a transaction is initiated at a particular node, the address mapping tables are employed to identify the destination node (and unit) which are then appended to the packet and used by the routing tables to identify the appropriate link(s) on which to route the packet. The source information is used by the destination node and any other nodes which are probed with the request to respond to the request appropriately.

According to a specific embodiment and as mentioned above, the interconnection controller in each cluster appears to the other processors in its cluster as just another processor in the cluster. However, the portion of the shared memory space associated with the interconnection controller actually encompasses the remainder of the globally shared memory space, i.e., the memory associated with all other clusters in the system. That is, from the perspective of the local processors in a particular cluster, the memory space associated with all of the other multi-processor clusters in the system are represented by the interconnection controller(s) in their own cluster.

According to an even more specific embodiment which will be described with reference to FIG. 5, each cluster has five nodes (e.g., as shown in FIG. 2) which include four processors 202a–d and an interconnection controller 230, each of which is represented by a 3-bit node ID which is unique within the cluster. As mentioned above, each processor (i.e., cluster node) may represent a number of sub-units including, for example, CPUs, memory controllers, etc.

Figure 5:
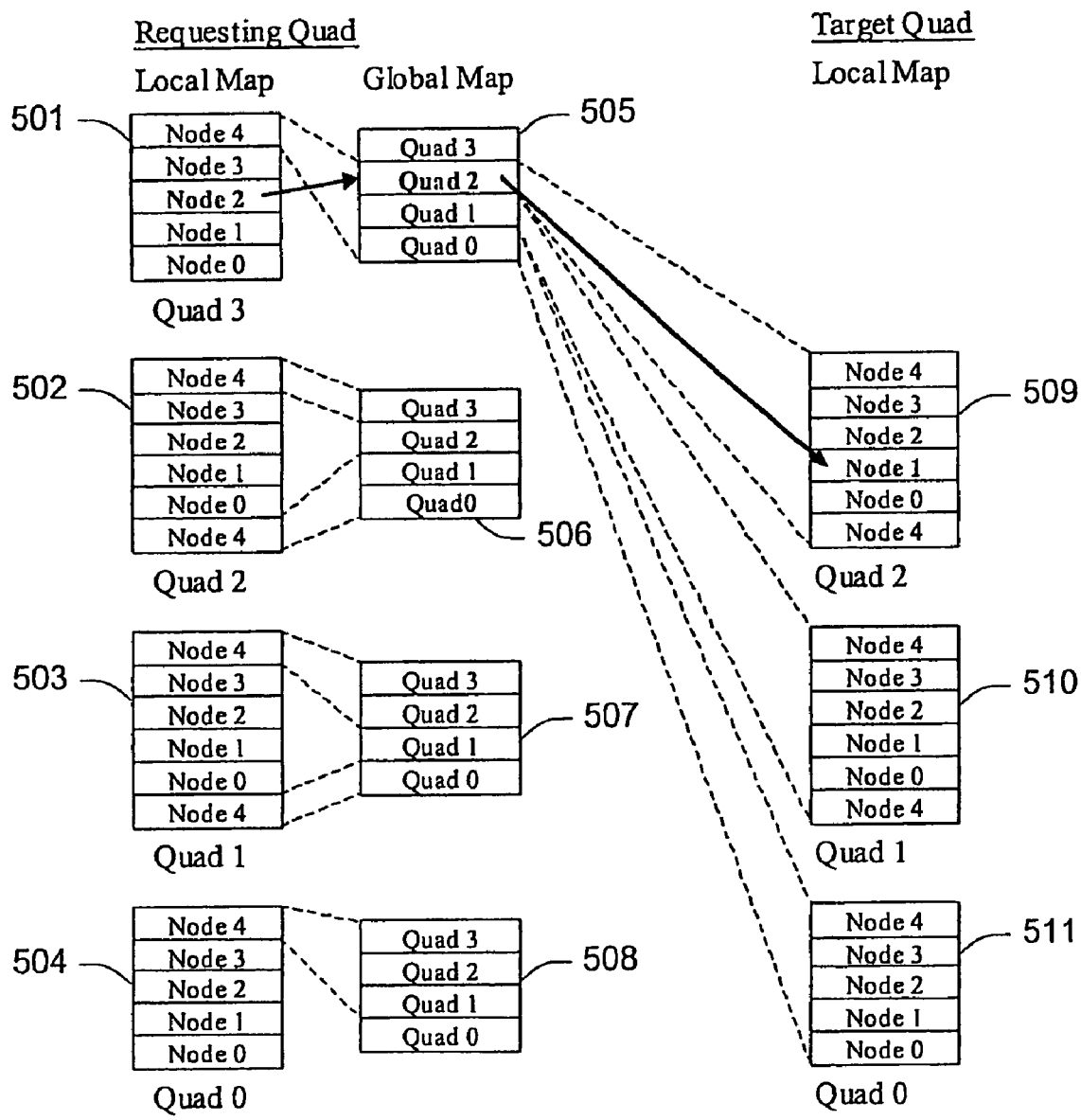
FIG. 5 is a diagrammatic representation of a memory mapping scheme according to a particular embodiment of the invention.

An illustration of an exemplary address mapping scheme designed according to the invention and assuming such a cluster configuration is shown in FIG. 5. In the illustrated example, it is also assumed that the global memory space is shared by 4 such clusters also referred to herein as quads (in that each contains four local processors). As will be understood, the number of clusters and nodes within each cluster may vary according to different embodiments.

To extend the address mapping function beyond a single cluster, each cluster maps its local memory space, i.e., the portion of the global memory space associated with the processors in that cluster, into a contiguous region while the remaining portion of the global memory space above and below this region is mapped to the local interconnection controller(s). The interconnection controller in each cluster maintains two mapping tables: a global map and local map. The global map maps outgoing requests to remote clusters. The local map maps incoming requests from remote clusters to a particular node within the local cluster.

Referring now to FIG. 5, each local cluster has a local memory map (501–504), which maps the local memory space (i.e., the contiguous portion of the global memory space associated with the local processors) into the respective nodes and maps all remote memory spaces (i.e., the remainder of the global memory space) into one or two map entries associated with the local interconnection controller(s), e.g., Node 4 of Quad 3. Each node in the local cluster has a copy of the local map. The interconnection controller in each cluster also maintains a global map (505–508) relating these remote memory spaces with each of the other clusters in the system. Each interconnection controller uses its copy of the local map (509–511) to map requests received from remote clusters to the individual nodes in its cluster.

An exemplary transaction described with reference to FIG. 5 may be illustrative. In this example, Node 2 in Quad 3 generates a request that maps (via map 501) to the local interconnection controller (i.e., Node 4). When the interconnection controller receives this request, its global map 505 maps the address to Quad 2. The interconnection controller then forwards the request to Quad 2. The interconnection controller at Quad 2 uses its local memory map to determine the proper node to target for the request—Node 1 in this example.

In a particular implementation, each processor or cluster node is limited to eight memory map registers. The scheme described above with reference to FIG. 5 requires four entries for the local memory space and at most two registers for remote space. Therefore, according to more specific embodiments, the two remaining entries can be used to subdivide regions. The eight mapping register limit requires that all memory local to a quad be allocated within a contiguous block. The interconnection controller's local memory map in such embodiments is also eight entries. However, the size of the interconnection controller's global map size is determined by the number of clusters in the system. According to various embodiments, the memory mapped I/O space is mapped by an identical set of mapping registers.

As described above, on the local cluster level, information from address mapping tables is used to identify the appropriate link on which to transmit information to a destination node within the cluster. To effect transmissions between clusters using the global mapping described above, a similar mechanism is needed. Therefore, according to various embodiments, in addition to the local routing tables associated with each node in a cluster, the interconnection controller maintains global routing information that maps the other clusters in the system to the various point-to-point transmission links interconnecting the clusters (e.g., links 111 of FIG. 1A).

According to a specific embodiment of the invention, two types of local routing tables are employed: one for directed packets and one for broadcast packets. Each table (e.g., tables 406 of FIG. 4) maintains a mapping between target nodes and links. For directed packets, a separate table is used for request and for responses. This allows responses to be routed back to the requester along the same path as the request. Maintaining the same route simplifies debugging and is not required for correctness. For broadcast packets, the corresponding table indicates on which links the broadcast packet is forwarded. A broadcast packet may thus be routed to multiple links.

In a particular implementation of the interconnection controller of the present invention, its local tables map a local destination node to one of four links for directed packets and any number of links for broadcast packets. The interconnection controller also maintains a global routing table which maps remote destination clusters to a particular remote link. According to a particular embodiment, the interconnection controller also supports multicast of packets at the global routing level.

Figures 6A, 6B:
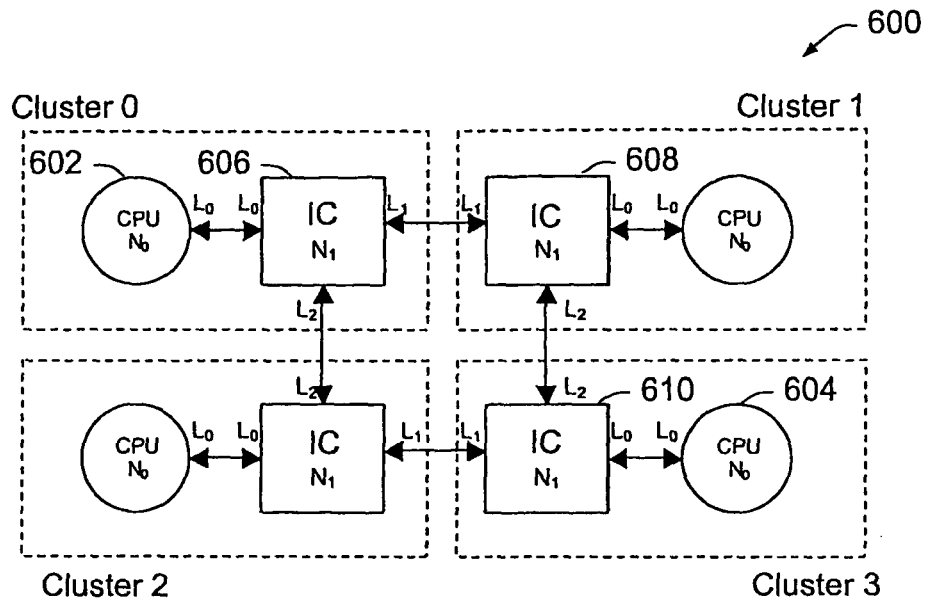
FIG. 6A is a simplified block diagram of a four cluster system for illustrating a specific embodiment of the invention.
FIG. 6B is a combined routing table including routing information for the four cluster system of FIG. 6A.

A specific embodiment of a routing mechanism designed according to the present invention will now be described with reference to FIGS. 6A and 6B. System 600 of FIG. 6A includes four clusters each having a plurality of local nodes including nodes $N_0$ and $N_1$. The table of FIG. 6B combines all of the local and global routing tables of the system for illustrative purposes.

As part of an exemplary transaction, a CPU 602 at node $N_0$ in Cluster 0 generates a packet directed to a CPU 604 at node $N_0$ in the Cluster 3. This packet could be, for example, a memory request that maps to a memory controller at that node. Because CPU 602 has no knowledge of anything outside of its cluster, it generates the packet targeting node $N_1$ in Cluster 0 (i.e., the local interconnection controller 606) as the destination. As discussed above, this is due to the fact that the local memory map owned by node $N_0$ (see the relevant portion of the table of FIG. 6B) identifies node $N_1$ as corresponding to all memory owned by remote clusters. Interconnection controller 606 receives the packet, uses its global address map (e.g., as described above) to determine that the final destination of the packet is Cluster 3, and generates a remote packet targeting Cluster 3. Then, using its global routing table (i.e., relevant portion of FIG. 6B), interconnection controller 606 determines that this packet must be sent out on link $L_1$. Similar to the local routing mechanism described above, information identifying the source and destination cluster is appended to the packet.

When interconnection controller 608 at Cluster 1 receives the packet, it also determines that the packet is destined for Cluster 3 and determines from its global routing table (FIG. 6B) that link $L_2$ must be used to send the packet. Interconnection controller 610 at Cluster 3 receives the packet, determines that the packet is targeting the local cluster, and uses its local routing table (FIG. 6B) to determine that local link $L_0$ must be used to send the packet to its destination. CPU 604 at node $N_0$ then receives the packet via link $L_0$. According to specific embodiments in which the node ID space is a 3-bit ID space, this multi-level routing mechanism can be extended to eight local nodes with no specific limit on the number of clusters.

Embodiments of the invention also address the issue of transaction identification in a system having a plurality of multi-processor clusters. In general, the importance of the unique identification of transactions in a multi-processor environment is understood. And where the transaction identification or tag space is limited, mechanisms to extend it are needed to enable the interconnection of more than the maximum number of processors supported by the limited tag space. That is, in an environment with a plurality of clusters operating with identical local transaction tag spaces, there is a potential for more than one transaction to be generated in different clusters simultaneously with the identical tag. Where those transactions occur between nodes in different clusters, the potential for conflict is obvious. Therefore, embodiments of the present invention provide mechanisms which extend the local tag spaces such that each transaction in the multi-cluster system is uniquely identified.

More specifically, these embodiments map transactions from the local transaction tag space to a larger global transaction tag space. As described above, the local tag space is specified using the node ID, the unit ID, and a transaction ID. On top of that, the global tag space is specified using a global cluster ID and a global transaction ID. According to one embodiment, the interconnection controllers in the system use their pending buffers to simplify the allocation and management of the mapping and remapping actions. According to an even more specific embodiment and as will be described, additional protocol management is used to maintain the uniqueness of the global transaction tags.

According to a specific embodiment, all transactions within a cluster are tagged with a unique ID generated by the requesting node. The processors in each cluster which are not the interconnection controller support a 3-bit node ID, a 2-bit unit ID and a 5-bit transaction ID. The combination of these fields creates a 10 bit tag which is unique within the cluster. The unit ID represents sub-units within a node. It should be noted that a particular node may or may not include a processor as one of its sub-units, e.g., the node might contain only memory.

According to one embodiment, to extend to the transaction tag space beyond the local cluster, each cluster's interconnection controller maps each its cluster's local tag space into the global tag space using a Q-bit Cluster ID and a T-bit Transaction ID. In the exemplary system in which each cluster has a 5-bit transaction ID and there are four clusters, T might be 7 and Q might be 2.

Figure 7:
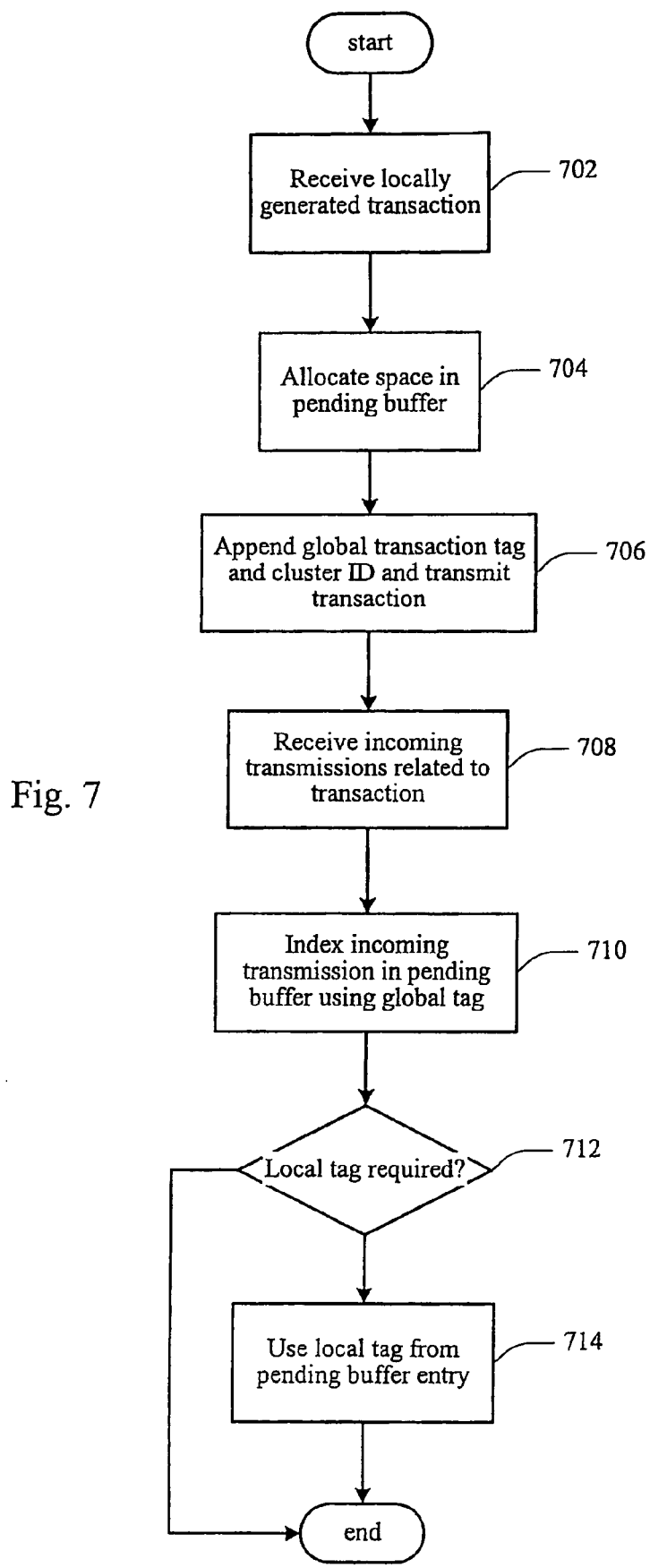
FIGS. 7 and 8 are flowcharts illustrating transaction management in a multi-cluster system according to specific embodiments of the invention.

According to one embodiment illustrated in FIG. 7, the local to global mapping process is accomplished as follows. New outgoing transactions, i.e., locally generated transactions involving remote clusters, are received by the cluster's interconnection controller (702) and are allocated an entry in the protocol engine's global pending buffer (704), e.g., pending buffer 309 of FIG. 3. The buffer entry identifier is unique for each such transaction, and therefore, according to various embodiments, is used as a unique global transaction tag. According to a specific embodiment, the number of entries in the pending buffer cannot exceed the size of the global transaction tag space for this mechanism. Also included in the pending buffer entry is the local transaction tag. Thus, the information mapping the transaction from the local tag space to the global tag space is implicitly contained in the pending buffer. The outgoing transaction is then tagged with the global transaction tag, along with a cluster ID that is specified during initial system configuration (706). When incoming transmissions associated with the transaction are received (708), the global transaction tag is used to index into the global pending buffer (710). If a local transaction tag is required (712), the local tag from the indexed pending buffer entry is used to tag the transaction (714).

Figure 8:
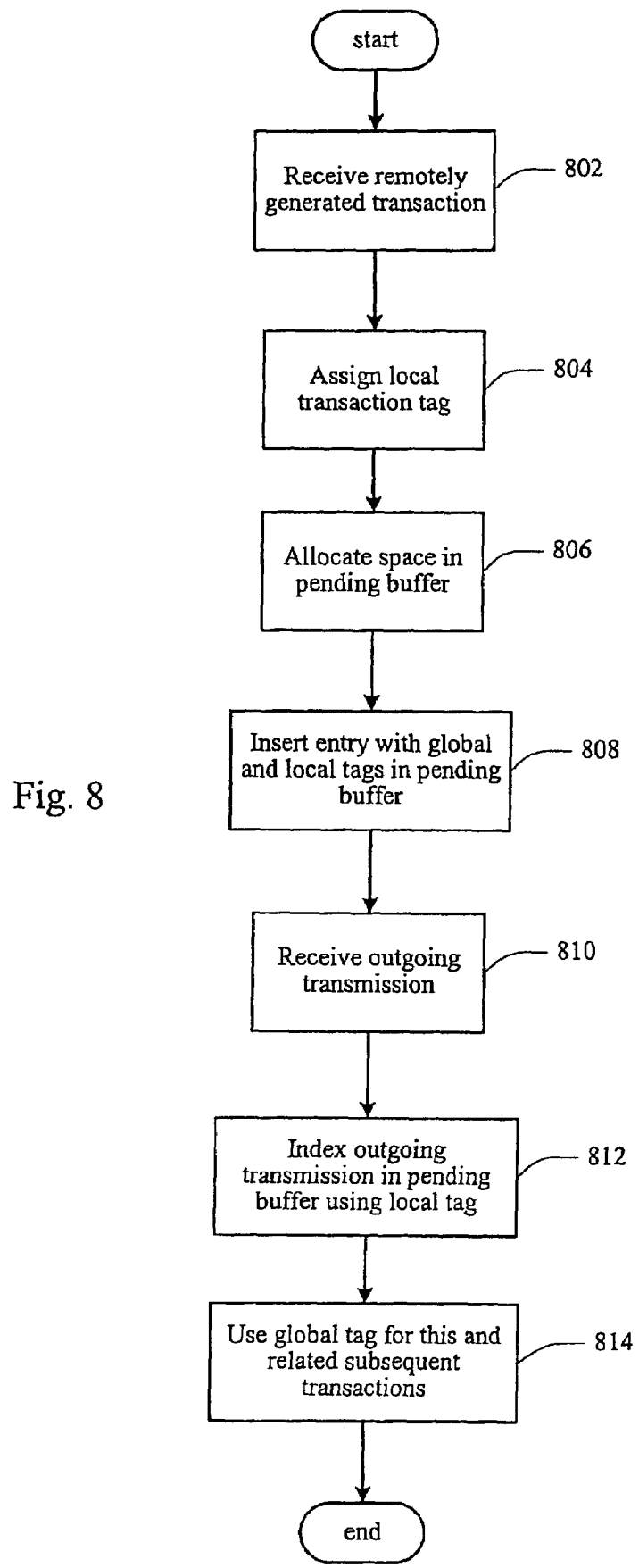

According to a specific embodiment illustrated in FIG. 8, the global to local mapping process is as follows. New incoming transactions, i.e., remotely generated transactions involving the local cluster, are received by the local cluster's interconnection controller (802) and assigned a local transaction tag using a similar mechanism as described above (804). In this case, a pending buffer entry is allocated in the protocol engine's local pending buffer (806), and an entry containing the global tag is inserted into the newly allocated pending buffer entry (808). When outgoing transmissions associated with the transaction are received (810), the local transaction tag is used to index into the local pending buffer to obtain the proper global tag (812) which is used if subsequent outgoing transmissions are required (814).

Figure 9:
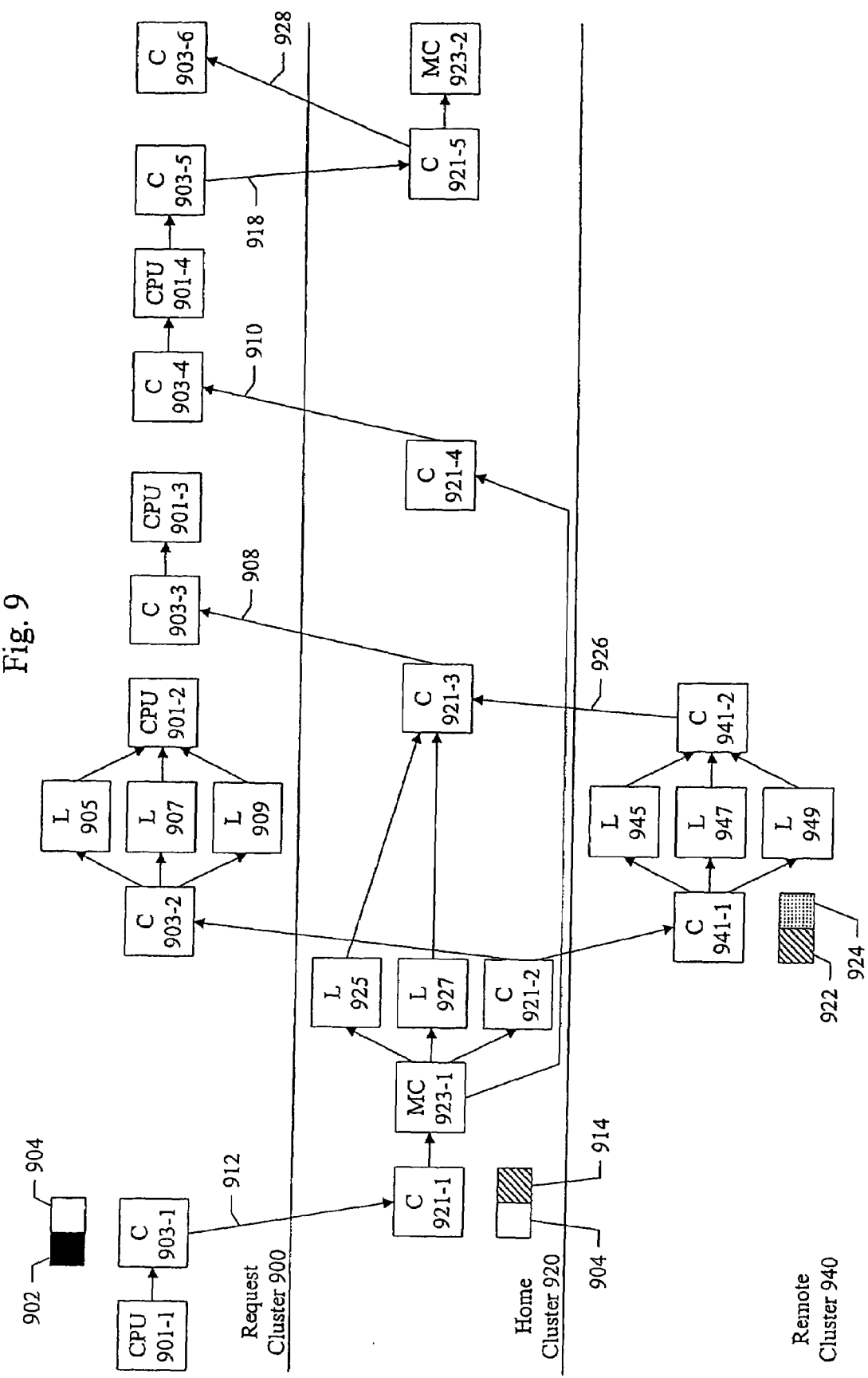
FIG. 9 is a diagrammatic representation of communications relating to an exemplary transaction in a multi-cluster system.

An example of the tag mapping mechanisms of a specific embodiment of the invention will now be described with reference to FIG. 9. FIG. 9 is a diagrammatic representation depicting the transactions for a data request from a local processor sent to a non-local cluster using an interconnection controller. It will be understood that the transactions depicted are merely exemplary and should not be used to limit the scope of the invention. The multi-cluster system includes a request cluster 900, a home cluster 920, and a remote cluster 940. The home cluster 920 and the remote cluster 940 are referred to herein as non-local clusters. Processors and interconnection controllers associated with local and non-local clusters are similarly referred to herein as local processors, local interconnection controllers, non-local processors, and non-local interconnection controllers, respectively.

According to various embodiments, processor 901-1 in a local cluster 900 sends a data access request such as a read request to an interconnection controller 903-1. The requesting node 901-1 generates the request with a local tag (e.g., tag 902) in the cluster's local tag space. The interconnection controller 903-1 maps the outgoing request into the global tag space (e.g., using global tag 904) and the mapping is saved in the pending buffer (e.g., buffer 309 of FIG. 3) of interconnection controller 903-1 as described above (e.g., table insertion: local tag 902/global tag 904). Interconnection controller 903-1 then forwards the request to an interconnection controller 921-1 in a home cluster 920. Incoming responses associated with the transaction (e.g., 908 and 910) are mapped from the global tag space back to the local tag space using a table lookup in the interconnection controller 903's pending buffer.

At home cluster 920, incoming requests (e.g., 912) are mapped by interconnection controller 921-1 into the local tag space (e.g., using tag 914) and the mapping is saved in the pending buffer of controller 921-1 (e.g., table insertion: global tag 904/local tag 914). Outgoing responses from home cluster 920 (e.g., 908 and 910) are mapped from the local tag space back to the global tag space using a table lookup in interconnection controller 921's pending buffer. Incoming responses to the home cluster are mapped from the global tag space back to the local tag space using a table lookup in interconnection controller 921's pending buffer.

In this exemplary transaction, interconnection controller 921-1 forwards the access request to a memory controller 923-1 also associated with home cluster 920. At this point, memory controller 923-1 locks the memory line associated with the request. In one example, the memory line is a unique address in the memory space shared by the multiple processors in request cluster 900, home cluster 920, and remote cluster 940. Memory controller 923-1 generates a probe associated with the data access request and forwards the probe to local nodes associated with cache blocks 925 and 927 as well as to interconnection controller 921-2.

Interconnection controller 941-1 at remote cluster 940 maps global tags (e.g., tag 922) into its local tag space using local tags (e.g., tag 924). Responses (e.g., 926) are mapped from the local tag space back to the global tag space using a table lookup in interconnection controller 941's pending buffer. In response to the probe from home cluster 920, interconnection controller 941-1 probes local nodes associated with cache blocks 945, 947, and 949. Similarly, interconnection controller 903-2 associated with request cluster 900 receives a probe and forwards the probe to local nodes associated with cache blocks 905, 907, and 909. Processor 901-2 receives probe responses from the local nodes associated with cache blocks 905, 907, and 909.

According to various embodiments, interconnection controller 921-3 accumulates probe responses and sends the probe responses to interconnection controller 903-3, which in turn forwards the probe responses to the processor 901-3. Interconnection controller 921-4 also sends a read response to interconnection controller 903-4, which forwards the read response to processor 901-4. After receiving the fetched data, processor 901-4 sends a source done response to interconnection controller 903-5. Interconnection controller 903-5 forwards the source done message to interconnection controller 921-5. Interconnection controller 921-5 in turn sends a source done message to memory controller 923-2.

According to a specific embodiment, interconnection controller 921-5 also acknowledges the Source Done transaction (918) with a tag release transaction (928) to controller 903-6 at the requesting cluster that allows it to reuse the tag. As described below, this acknowledgment prevents the requesting cluster from reusing a global tag until the global tag is no longer in use in the system. It should be noted that the above-described tag mapping mechanism works for all transaction types with the exception of the Source Done transaction. In this case, the outgoing SD transaction received by the interconnection controller at the requesting cluster is tagged with the local node's identifier. As a result, the interconnection controller at the requesting cluster must search its pending buffer for an entry with a matching local tag and then use the index as the global tag. The same mechanism is required when the SD transaction reaches the home cluster. In this case, the pending buffer at the home quad is searched for a matching global tag and the index is used as the local tag.

According to a specific embodiment, the final tag release transaction (e.g., 928) is provided to inform the requesting cluster when a given tag may be reused. This tag release mechanism is for preventing ambiguity of Source Done (SD) transactions at the home cluster. For example, without such a mechanism, after the requesting cluster completes a transaction and a SD transaction is sent to the home cluster (e.g., 918), a new transaction can be generated at the requesting cluster with the same global tag. A transmission associated with this transaction could potentially be received at the home cluster and inserted into the home cluster pending buffer prior to the receipt of the first SD transaction as they travel on different virtual channels. Under such circumstances, the pending buffer at the home cluster would have multiple entries with the same global tag. Requiring the tag release transaction forecloses this possibility.

Specific embodiments of multiple-cluster architecture have used the same protocol for transactions sent on both intra-cluster and inter-cluster links. One such protocol is HyperTransport™ ("HT") protocol, which was specifically designed for communication of commands and data among subsystems of a computer system, such as multiple levels of processor caches, local and remote memory elements and various input/output ("I/O") devices. The white paper entitled "Meeting the I/O Bandwidth Challenge: How HyperTransport Technology Accelerates Performance in Key Applications" (HyperTransport™ Consortium, December 2002) is hereby incorporated by reference.

As used herein, a protocol for transactions sent on an intra-cluster link will sometimes be referred to as an "intra-cluster protocol" and a protocol for transactions sent on an inter-cluster link will sometimes be referred to as an "inter-cluster protocol." Although HT protocol is often used as an example of an intra-cluster protocol in this disclosure, the present invention can be used with any convenient intra-cluster protocol.

Figure 10:
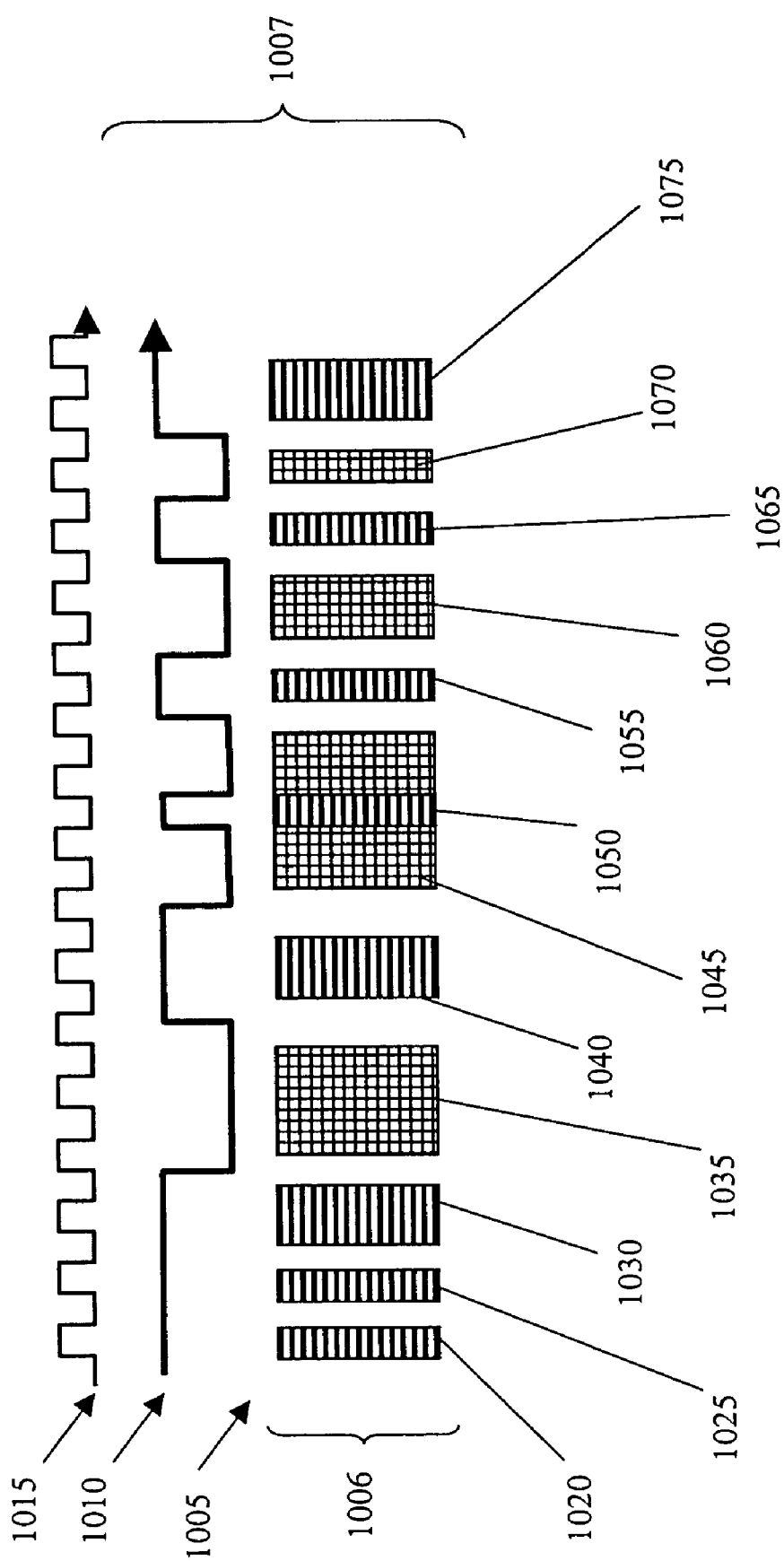
FIG. 10 illustrates a sequence of data and control packets transmitted according to HyperTransport™ (HT") protocol.

According to the HT protocol, there are three basic types of signals, which are illustrated in FIG. 10. The first type is "CAD" (command, address, data) signal 1005, which is a multiplexed signal carrying "control" (request, response, information) signals and data signals. The second type is CNTL signal 1010, which differentiates between control and data signals. The third type of signal is CLK signal 1015. Data are transmitted (or received) at both edges of CLK signal 1015. For the sake of simplicity, FIG. 10 indicates signals traveling in a single direction, but signals normally travel in both directions on an HT link.

The control information and data of CAD signal 1005 are formed into packets, in multiples of 32 bits. Control packets are 32 bits long (such as packets 1020 and 1025) or 64 bits long (such as packet 1030). Data packets range in length from 32 bits (e.g., packet 1070) to 512 bits. HT protocol allows a control packet to be sent within a data packet. For example, data packets 1035 and 1045 are both 128 bits long, but control packet 150 is transmitted after data packet 1045 started and before data packet 1045 ended.

Data path 1006 may be 2, 4, 8, 16 or 32 bits wide. If data path 1006 is narrower than 32 bits, successive "bit-times" are used to complete the transfer of a packet. For example, if CAD signal 1005 is carried on an 8-bit wide link, 4 bit-times would be required to complete the transfer of 32-bit control packet 1020.

CTL signal 1010 differentiates control packets from data packets. When CTL signal 1010 is high (a "1"), this condition indicates that a control packet (or a portion of a control packet) is being transferred in parallel with CTL signal 1010. Accordingly, CTL signal 1010 of FIG. 10 is high when control packets 1020, 1025, 1030, 1040, 1050, 1055, 1065 and 1075 are transmitted. When CTL signal 1010 is low (a "0"), this condition indicates that some or all of a data packet is being transferred in parallel with CTL signal 1010. Therefore, CTL signal 1010 of FIG. 10 is low when data packets 1035, 1045, 1060 and 1070 are transmitted. CTL signal 1010 requires 1 bit per bit-time.

CLK signal 1015 helps to keep CAD signal 1005 and CNTL signal 1010 synchronized. If CAD signal 1005 is transmitted on a data path of 8 bits or less, one CLK signal 1015 is transmitted in parallel with CAD signal 1005. If CAD signal 1005 is transmitted on a data path greater than 8 bits in size, more than one CLK signal 1015 is preferably transmitted.

In the example shown in FIG. 10, data path 1006 is 8 bits wide. CNTL signal 1010 and CLK signal each require a 1-bit data lane. Accordingly, link 1007 is 10 bits wide. However, as noted above, many other link widths are possible.

The HT protocol provides for the orderly and efficient communication of probes and responses on intra-cluster links of a multi-processor cluster, such as point-to-point links 232a–d of FIG. 2. However, intra-cluster links provide a different environment from those of inter-cluster links. Signals transmitted on inter-cluster links (such as point-to-point links 111a–f of FIG. 1A and point-to-point links 141a–d of FIG. 1B) tend to include more errors than signals transmitted within processing clusters. One reason for the increase in errors is that inter-cluster links are relatively longer than intra-cluster links and therefore pick up more noise.

In addition, the extra length of inter-cluster links exacerbates the effect of skew between bit lanes. If the CLK signal does not arrive with the corresponding CAD signal, an arriving HT packet will not be deciphered properly.

Figure 11A:
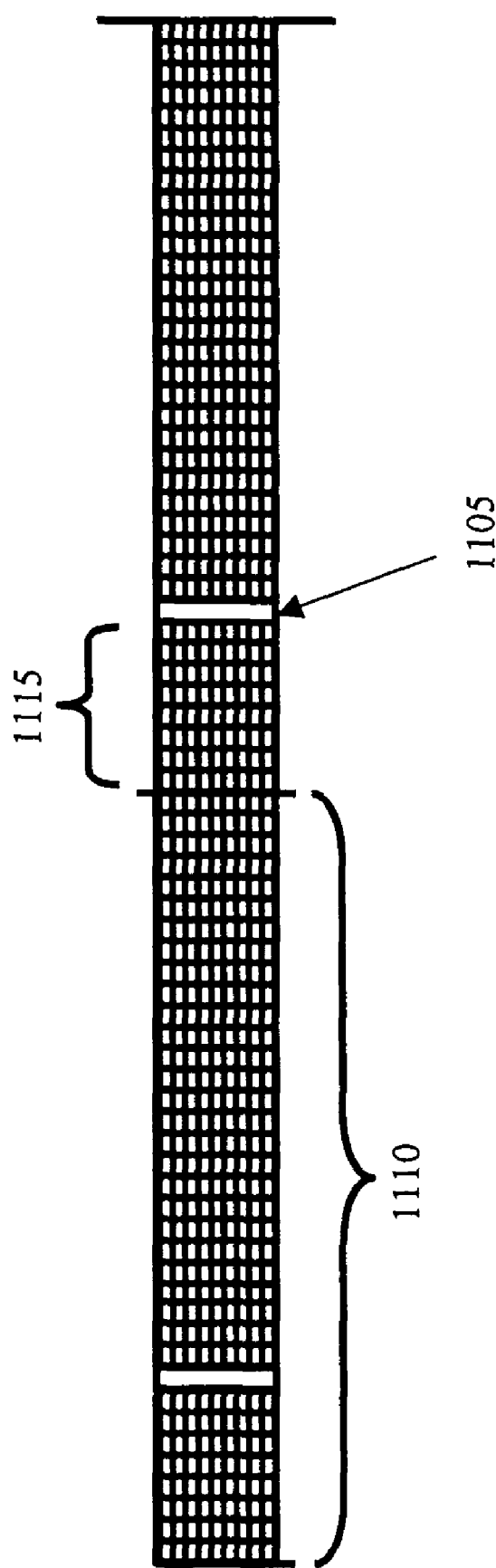
FIG. 11A is a diagram that illustrates an error detection process according to HT protocol.

Therefore, the HT protocol does not provide satisfactory skew detection or correction capabilities for inter-cluster links. Moreover, the HT protocol does not provide satisfactory error detection or correction capabilities for inter-cluster links. Other protocols used for intra-cluster links have similar drawbacks. Some of the limitations of error detection according to HT protocol will now be described with reference to FIG. 11A.

According to the HT protocol, a cyclic redundancy code ("CRC") check is performed on HT links. CRC check data 1105 are inserted in a bit stream at regular intervals. CRC check data 1105 are calculated on each data lane independently and cover the link as a whole. CTL signal 1010 is included in the CRC check calculation.

CRC check data 1105 are computed based on a 512 bit-time window of data, beginning with the transmission after a link is initialized. The first 512 bit-time window after link initialization will not include CRC check data 1105. However, every subsequent CRC window will contain 516 bit-times, including 4 bit-times of CRC check information.

For example, CRC check data 1105 for 512-bit-time window 1110 are transmitted for 4 bit-times in the following 512 bit-time window, after window 1115 of 63 bit-times. In other words, CRC check data 1005 are transmitted in bit-times 64 through 67.

CTL signal 1010 is a "1" when CRC check data 1005 are transmitted. However, there is no other indication that CRC check data 1010 are being transmitted. Therefore, the nodes on each end of the link must count bit-times from the beginning of the first valid packet after link synchronization to determine the boundaries of the CRC windows.

CRC window 1110 will often span multiple data and/or control packets. This is true because an HT packet has a maximum size of 512 bits and is sent over a link having a "width" of at least 2 bits and usually 8 or 16 bits. On a link having a 16-bit width, a maximum-sized packet would be sent in 32 bit-times. Therefore, at least 16 packets would be sent during a 512 bit-time window 1010 during which a cumulative CRC check is calculated. If the data packets were transmitted over an 8-bit link, at least 8 maximum-sized data packets would be transmitted over CRC window 1110.

Because the cumulative CRC check is calculated over many packets, the HT protocol does not provide a way of determining which packet contains an error. Other aspects of the HT protocol further complicate the process of isolating data packets with errors. For example, in HT protocol a command packet can be "interleaved" within a data packet. Moreover, bit-time window 1005 does not necessarily begin or end at a packet boundary, but instead can start or end within a packet.

As noted above, other protocols may satisfactorily be used for intra-cluster communications. However, these protocols do not have adequate error detection and correction mechanisms for inter-cluster links.

In order to address these and other issues, the present invention provides methods and devices for implementing enhanced error detection and correction capabilities, particularly for inter-cluster signals. These enhancements to HT error detection and correction are made possible in part by encapsulating each HT packet as an individual "high-speed link" ("HSL") packet for transmission on inter-cluster links. Preferably, no interleaving of control and data packets is permitted. Preferably, the HSL packets are link-layer packets that are "serialized" for transmission on the inter-cluster links and then "deserialized" after receipt.

Figure 11B:
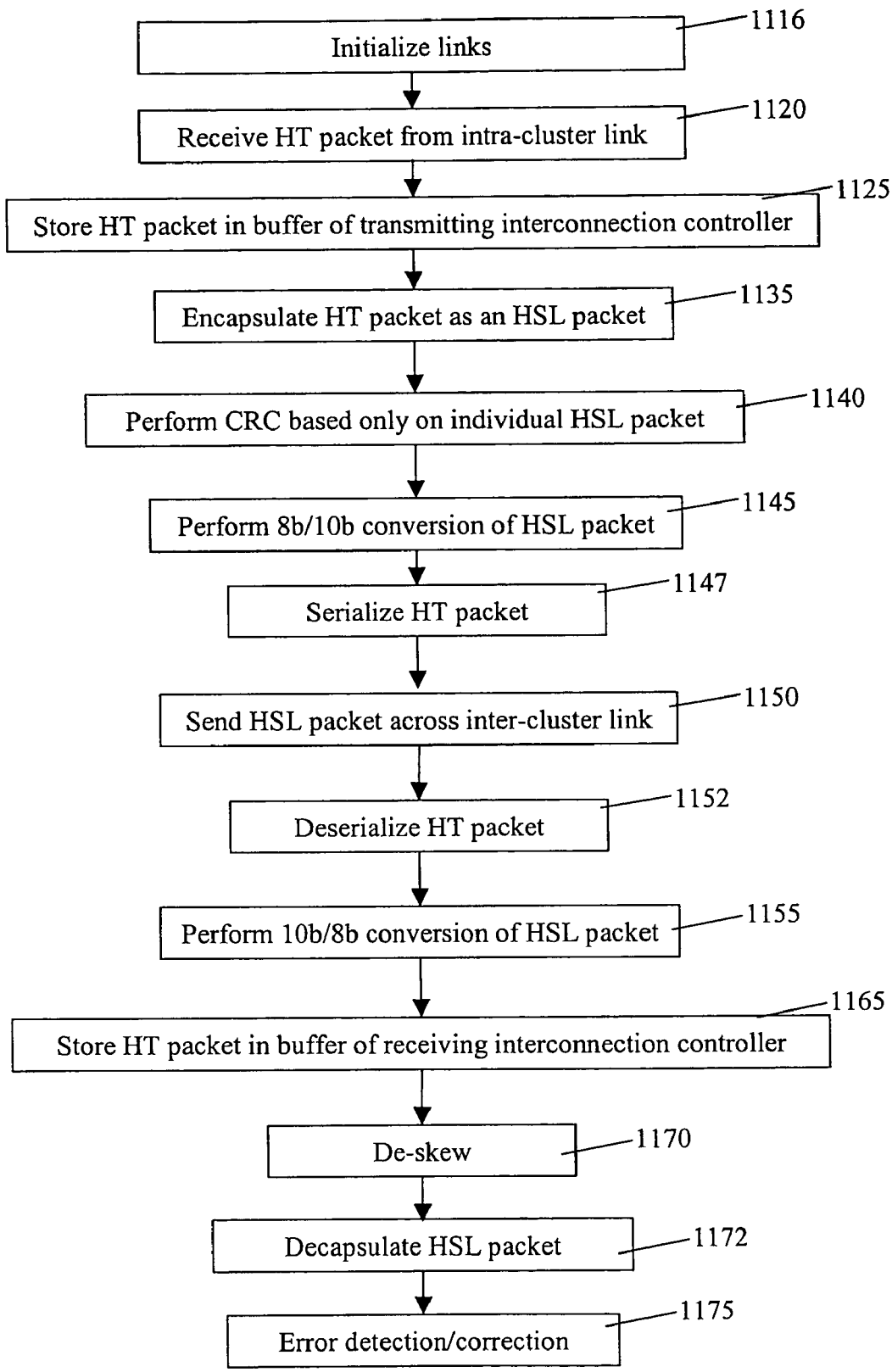
FIG. 11B is a flow chart that outlines a process according to one implementation of the invention.

FIG. 11B is a flow chart that presents a broad outline of one such implementation of the present invention. The steps of FIG. 11B need not be performed in precisely the order shown.

In step 1116, the intra-cluster and inter-cluster links are initialized. The intra-cluster links are initialized by following the initialization procedures for the protocol used for intra-cluster communications, e.g., HT protocol.

The HT initialization sequence is as follows: first, the CAD signals are all 1's and the CNTL signal is set to 0. Then, the CNTL signal is set to 1 and the CAD signals are all 1's. The CNTL signal remains 1 until 16 bit-times after the CNTL signal from the other device is received. However, because there is no way to determine in advance how much time will elapse before the CNTL signal from the other device is received, this step introduces variability into the HT initialization process.

Both the CAD and CNTL signals are then set to 0 for 512 plus (4*N) bit-times, where N is a positive integer. Then, the CAD signal goes to all 1's while the CNTL signal remains at 0 for 4 bit-times. Then, the CNTL signal goes to 1, after which the first CRC window begins and transmissions of meaningful CAD, CNTL and CLK signals begin.

The inter-cluster links are also synchronized during the initialization process, but preferably using an initialization process that does not introduce variability. This synchronization is maintained after the initialization process. These procedures permit greater skew detection and correction than is possible using the HT initialization procedure. Skew detection and correction will be discussed in more detail below with reference to FIG. 16.

In step 1120, a packet (in this example, an HT packet) is received by an interconnection controller in a home cluster via an intra-cluster link. The packet may be received, for example, from a processor within the home cluster according to a coherent protocol. Alternatively, the packet may be received from an I/O device in the home cluster via a noncoherent protocol.

In step 1125, the incoming packet is read and then is stored in a buffer of the home interconnection controller, preferably a history buffer. Preferably, a copy of the packet remains in the history buffer until an acknowledgement ("ACK") packet is received from the remote interconnection controller, indicating error-free reception of the packet. This process is described below with reference to FIGS. 12 and 15.

In step 1135, a header is added to the packet. Preferably, the header is used for link layer encapsulation of the packet, transforming the packet to a high-speed link ("HSL") packet. In step 1140, a CRC check is performed based only upon the HSL packet and its header.

In step 1145, the bits of the packet are converted, e.g., using an 8 bit to 10 bit conversion, a 4 bit to 5 bit conversion, or another such conversion. As will be described below, this conversion is a method of embedding clock information in the packet and keeping the transmitting and receiving end points of the inter-cluster link synchronized. In step 1147, the packet is serialized. Then, in step 1150 the packet is transmitted on the inter-cluster link.

Steps 1120 through 1150 are described below with reference to FIG. 13. These steps may be performed, for example, by transceiver 315 and serializer/deserializer 313 of interconnection controller 230, acting alone or in concert with other components of interconnection controller 230.

In step 1152, the HSL packet is received by a remote interconnection controller and deserialized. In step 1155, the deserialized packet is converted back to 8-bit (or 8-bit) data. In step 1165, the packet is stored in a buffer of the remote interconnection controller. In step 1170, a skew correction is performed on the packet. In step 1172, the packet is decapsulated to form a packet in HT format.

In step 1175, errors are detected and corrective actions are performed, if necessary. In preferred implementations, the remote interconnection controller performs a CRC check based only on an individual received packet and compares the results to CRC check data encoded in that packet. According to some implementations, error detection includes the detection of gaps in the sequence identifiers of received packets. The remote interconnection controller notifies the home interconnection controller about received packets, e.g., by sending an ACK packet that identifies packets received error-free. Steps 1155 through 1175 will be described in more detail below with reference to FIG. 15.

Figure 12:
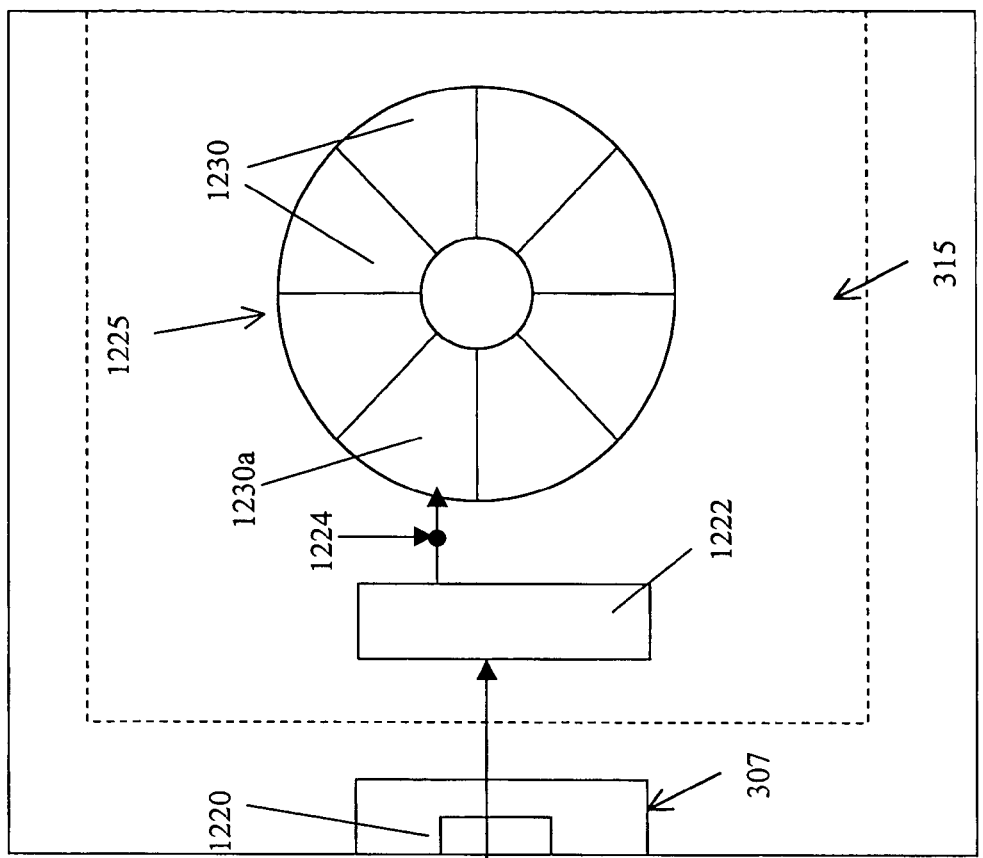
FIG. 12 illustrates one example of reading an HT packet and storing it in a buffer of an interconnection controller.

FIG. 12 depicts the process of receiving HT packets on an intra-cluster link, encapsulating the packets for transmission on an inter-cluster link and writing them into a buffer of a home interconnection controller. In this example, link 1007 is 19 bits wide, including 16-bit data path 1006 for CAD signals 1005, 2 bits for CLK signals 1015 and 1215, and 1 bit for CNTL signal 1010. In other embodiments, data path 1006 has another width, e.g., an 8-bit width or a 32-bit width. CAD signals 1005 include 192-bit HT data packet 1205 and 64-bit HT control packet 1210.

Here, link 1007 is an intra-cluster link from a processor in a home cluster to home interconnection controller 230. Link 1007 is comparable to links 232a–232d of FIG. 2. HT data packet 1205 and HT control packet 1210, both of which will later be transmitted on an inter-cluster link, are arriving at a connection between intra-cluster link 1007 and intra-cluster interface circuitry 1220 of coherent interface 307. Intra-cluster interface circuitry 1220 may include any devices known in the art for connecting a link to a processor.

In this example, link 1007 is a 25.6 Gb/sec link, which means that 32 bits of data are read at a rate of 800 MHz. However, link 1007 could be a higher-bandwidth or a lower-bandwidth link. According to this example, there are two bit-times per clock cycle (i.e., the rising and falling edges of the clock). HT control packet 1210 is a 64-bit packet, so 4 bit-times will be required to receive HT control packet 1210: each bit-time, 16 bits of HT control packet 1210 are received. During the first clock cycle, words 1235 and 1240 are received, along with the corresponding portions of CNTL signal 1010 and CLK signals 1015 and 1215.

Here, transceiver 315 of interconnection controller 230 includes encapsulation logic 1222, which is preferably link-layer logic. In alternative embodiments, encapsulation logic 1222 is part of a separate transmitter or is within another component of interconnection controller 230. Encapsulation logic 1222 encapsulates the information arriving on intra-cluster link 1007 into high-speed link ("HSL") packets for transmission on inter-cluster links. Here, control packet 1210 is encapsulated within HSL packet 1224. An HSL packet is preferably "alive" for transmission across only one inter-cluster link. Preferably, control packet 1210 is multiplexed as part of the encapsulation process.

According to some implementations of the invention, before each HSL packet there is a start of packet ("SOP") delimiter and after each HSL packet there is an end of packet ("EOP") delimiter. Preferably, the SOP and EOP delimiters are not part of the packet itself. For example, the EOP delimiter could be a K control variable (a 10b code that does not map to 8-bit data) at the end of a packet. For example, the SOP delimiter could be a non-K control variable received prior to the beginning of the packet.

Moreover, each HSL packet preferably includes a CRC check data field corresponding to a CRC check based only on that HSL packet. In the example described herein with reference to FIGS. 12 and 14, the CRC check has not yet been performed, so a placeholder in HSL packet 1224 is formed to provide a space for CRC check data to be written at a subsequent time.

According to preferred implementations of the invention, a copy of HSL packet 1224 will be retained in history buffer 1225 until an acknowledgement is received indicating that HSL packet 1224 (or a group of packets including HSL packet 1224) was received without errors. In the example shown in FIGS. 12 and 14, HSL packet 1224 is written to buffer space 1230a and then read from buffer space 1230a for further processing. Alternatively, a copy of HSL packet 1224 may be written to history buffer 1225 while HSL packet 1224 continues through the subsequent processing indicated in FIG. 13. Preferably, a sequence identifier of HSL packet 1224 allows the buffer spaces and indices corresponding to the packet (or group of packets) to be identified and purged from history buffer 1225 after the acknowledgment is received. The HSL packet in the history buffer can be directly or indirectly accessed using sequence identifier).

In this example, history buffer 1225 is a first-in, first-out ("FIFO") buffer having multiple buffer spaces 1230 for storing incoming packets. Although only 8 buffer spaces are depicted in history buffer 1225, this is merely a representation for the sake of simplicity. One of skill in the art will appreciate that more buffer spaces would normally be used. In other implementations, history buffer 1225 includes 16, 32, 64 or more buffer spaces, each of which can store 512 bits. However, other embodiments include more or fewer buffer spaces. Each buffer space is preferably "indexed," according to any technique known to those of skill in the art, to allow the identification of portions of the data stored in each buffer space.

Some example formats for HSL packets will now be described with reference to FIGS. 13A through 13I. As noted above, these HSL packets are preferably link-layer packets. The fields used in these packets, the lengths of the fields, the overall packet lengths, etc., are all purely illustrative. The 96-bit lengths of these exemplary packets correspond with the combined lengths of double words 1411, 1413 and 1415 prior to the 8b/10b (or other) conversion that will be described below with reference to FIG. 14.

FIG. 13A depicts an HSL packet suitable for encapsulating a 32-bit HT control packet. In this example, the first 32 bits are used to encode the HT control packet itself. The next 32 bits may be unused, but are preferably used to encode an "ACK" or "NACK" packet for acknowledging the successful or unsuccessful receipt of previous packets. More about ACK/NACK packets will be stated below with reference to FIGS. 13J and 15.

In this example, the next 20 bits of the packet are used to encode the packet "header," which in this case is not at the beginning of the packet. The first 6 bits of the header are used to encode a sequence identifier for the transmitted packet (here, the control packet). The sequence identifier preferably corresponds with a buffer space and a range of buffer indices in history buffer 1225 of the "home" or transmitting interconnection controller.

When, as in this example, the encapsulated packet is sent in a single transmission (here, a 96-bit transmission), a single sequence identifier is preferably used to identify the packet. Accordingly, a single sequence identifier could be used to identify the packets illustrated in FIGS. 13A through 13D. However, as described below, when the encapsulated packet will be sent in multiple transmissions (for example, in the case of a data packet requiring more than one transmission), a range of sequence identifiers is preferably used to identify individual transmissions of the packet. Accordingly, a range of sequence identifiers is preferably used to identify the packets illustrated in FIGS. 13E through 13I. However, in some implementations, only the first or the last transmission will include an encoded sequence identifier.

When an "ACK" is sent back to the transmitting interconnection controller indicating the successful receipt of a packet (or preferably, of a range of packets), the link-layer packet identifies the packet(s) according to the sequence identifiers. Then, history buffer 1225 of the home interconnection controller purges the buffer spaces that correspond to the packets that have been received by the remote interconnection controller without errors.

The next field is a 2-bit field that indicates the packet type. The packet type field indicates what kind of packet or packets are in the payload of the HSL packet. In one implementation, encoding "00" in the packet type field indicates that the HSL packet includes a 32-bit protocol-layer control packet and a 32-bit link-layer packet, as depicted in FIG. 13A. However, in other implementations, different field lengths and encoding types may be used.

In this implementation, the next field is a 12-bit "remote bits" field that identifies the source and destination clusters for protocol layer commands such as those in the control packet depicted in 13A. This field serves a different purpose when data packets are in the payload, as will be described below with reference to FIG. 13C.

The last field is a 12-bit field for encoding CRC check information for the HSL packet being transmitted. Although the CRC check field follows three header fields in this example, the CRC check field is not always part of the header, as noted below.

FIG. 13B illustrates one example of an HSL packet having one 64-bit control packet (such as control packet 1210 of FIG. 12) as its payload. In this example, "01" is encoded in the packet type field to indicate the 64-bit control packet in the payload.

FIG. 13C depicts the format of an HSL packet suitable for encapsulating a 32-bit data packet. The second 32-bit field is unused in this example. The packet type field indicates that a data packet is encapsulated: in this example, the packet type field indicates a "10."

Because data packets may require more than 96 bits of payload and overhead, data packets preferably include a packet length field, which is an 8-bit field in this example. Here, the packet length field would indicate that the packet is 96 bits long. This information may be encoded in any convenient manner, e.g., indicating the packet length in bits, bytes, data words, data transmissions, etc.

In some cases, the CRC check field of a data packet is longer than that of a control packet, because data packets may be considerably longer than control packets. In this example, 16 bits are used to encode CRC check information even for an HSL packet that includes only a 32-bit data payload.

As noted in FIG. 13D, encapsulating a 64-bit HT data packet requires only 32 bits of payload (50%) as compared to 64 bits of payload for a 32-bit data packet (200%). Otherwise, the format of an HSL packet with a 32-bit data payload is very similar to that of an HSL packet with a 64-bit data payload.

FIG. 13E illustrates an HSL packet with a 96-bit data payload, which requires two 96-bit transmissions according to this implementation. In this example, the sequence identifier, packet type and packet length fields are part of a header in the first 96-bit transmission. The packet length field indicates a total length of 6 double words. Preferably, a data packet that requires more than one 96-bit transmission will be assigned more than one sequence identifier. In some implementations, each 96-bit transmission has a different sequence identifier. However, because in some implementations the packet length field indicates how many transmissions are required, it is not necessary to have a sequence identifier field in subsequent transmissions; therefore, only the first or the last transmission will include a sequence identifier.

The last 16 bits of the first transmission and 48 bits of the second transmission are not used in this example. The data payload is not delivered in contiguous parts in this example, but instead the data are encoded as the first 64 bits of the first transmission and the first 32 bits of the second transmission.

Unlike the previous examples, the CRC check field does not follow a packet length or remote bits field of a packet header. Instead, the CRC check field follows the 48 unused bits of the second transmission. This sequence is appropriate, because the CRC check calculation should include all of the previous fields of the HSL packet.

FIG. 13F depicts an HSL packet that includes a 128-bit data packet. In this example, the format is substantially the same as that for encapsulating a 96-bit data packet, except that the second double word of the second transmission is a data field instead of an unused field.

FIG. 13G depicts an exemplary format for encapsulating a 160-bit data packet for transmission on an inter-cluster link. The packet length field indicates a total length of 9 double words. All three double words of the second transmission consist of data. Only the last word of the third transmission, the CRC check field, is used.

The HSL packet depicted in FIG. 13H is suitable for encapsulating a 192-bit data packet such as HT data packet 1205 of FIG. 12. The HSL packet shown in FIG. 13H is substantially similar to the one depicted in FIG. 13G, except that the former includes data in the seventh double word.

FIG. 13I shows an exemplary format of an HSL packet carrying a 512-bit data payload, which is the maximum size of HT data packets. The packet length field will indicate that this HSL packet has a length of 18 double words or 576 bits. The fourth through fifteenth double words are the data payload. Accordingly, the overhead accounts for only 12.5% of the total HSL packet size.

FIG. 13J illustrates one example format for an ACK/NACK packet that may be encapsulated in an HSL packet such as that illustrated in FIG. 13A. This type of packet may be, for example, an ACK packet used to indicate the receipt by a remote interconnection controller of error-free HSL packets transmitted on an inter-cluster link from a home interconnection controller. In this example, the first field is an 8-bit command field, which could contain commands such as ACK, NACK, RETRY, etc. An ACK could be signified, for example, by a value of 00000001 and a NACK and/or RETRY by a value of 00000010. In this example, the next 17 bits are reserved, followed by a 6-bit field for encoding the sequence identifier of the last error-free packet. Here, the last bit is reserved to indicate whether the sequence identifier in the previous field is valid. An invalid setting results in no link layer action.

Figure 14:
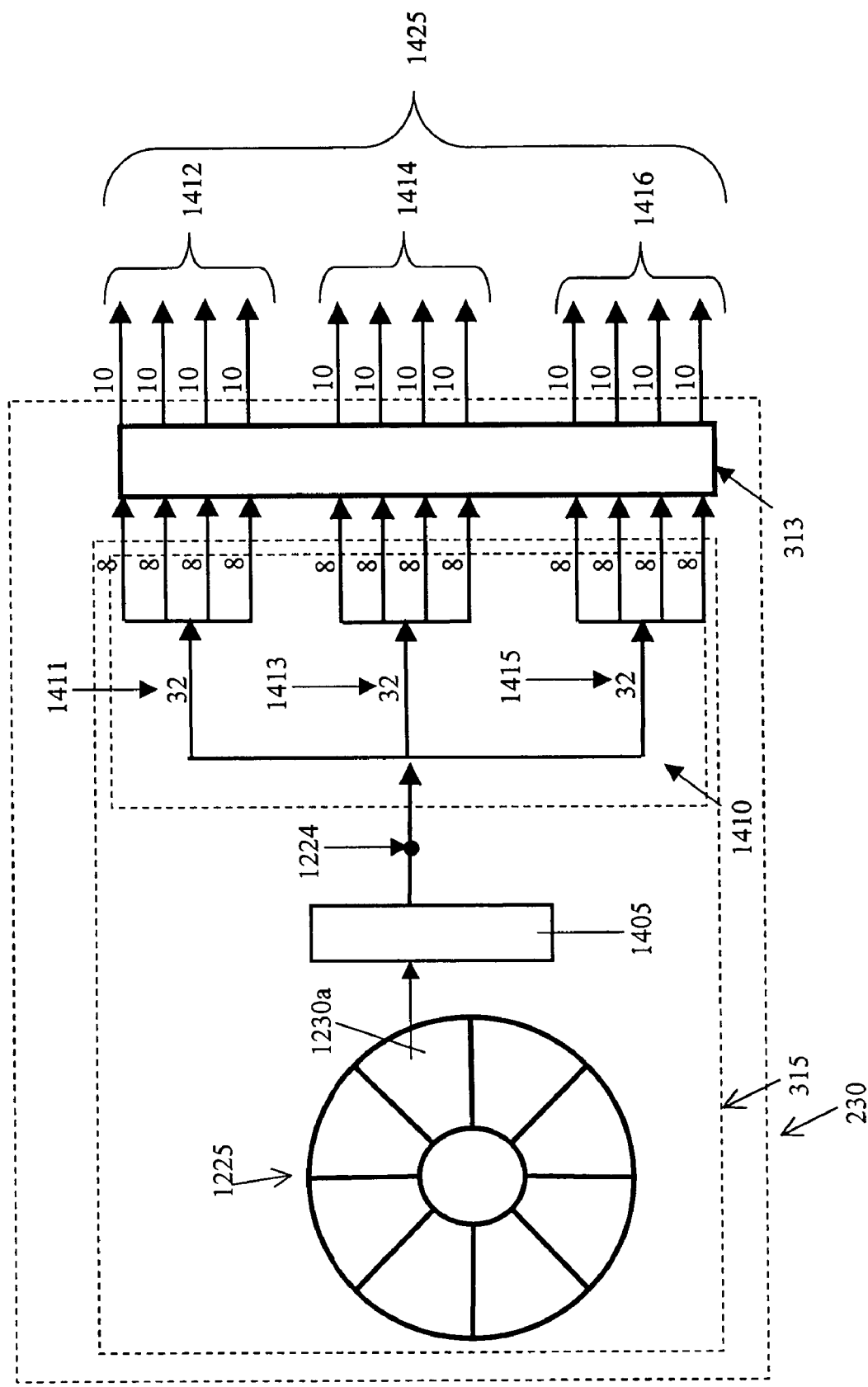
FIG. 14 illustrates a method of serializing HT packets for transmission on an inter-cluster link.

Referring now to FIG. 14, a method of the present invention for further processing HSL packet 1224 will be described. In this example, HSL packet 1224 is forwarded from buffer space 1230a of history buffer 1225 to CRC generating logic 1405, wherein a CRC value is generated and encoded in packet 1210. In this example, CRC generating logic 1405 is part of the link-layer logic of transceiver 315 of interconnection controller 230, but CRC generating logic 1405 may be located elsewhere. In alternative embodiments, HSL packet 1224 is forwarded directly from encapsulation logic 1222 to CRC generating logic 1405 and a copy of HSL packet 1224 is forwarded to history buffer 1225. Preferably, the CRC data are based on a CRC calculation that includes only the information of control packet 1210 (including the header) and no other packet. Computing CRC data for individual HSL packets allows for error detection and correction on a per-packet basis.

In this implementation, asynchronous FIFO 1410 receives HSL packet 1224 from CRC generating logic 1405, then forms 32-bit double word 1411 of HSL packet 1224 into four 8-bit symbols. In other implementations, HSL packet 1224 is processed in a different manner, e.g., into eight 4-bit units. One 8-bit word is transmitted on each of the 4 data lanes of group 1412 of inter-cluster link 1425. According to some such implementations, double word 1411 corresponds with words 1235 and 1240 of control packet 1210. In this example, inter-cluster link 1425 has 12 data lanes, but inter-cluster link 1425 may have any convenient number of data lanes.

Similarly, asynchronous FIFO 1410 forms 32-bit double word 1413 of HSL packet 1224 into four 8-bit symbols. One 8-bit symbol is transmitted on each of the 4 data lanes of group 1414. According to some such implementations, double word 1413 corresponds with the third and fourth words of control packet 1210.

Double word 1415 is also formed into four 8-bit symbols, for transfer on group 1416 of inter-cluster link 1425. According to some implementations of the invention, double word 1415 is used for link layer encapsulation of control packet 1210 as an HSL packet (HSL packet 1224). In this implementation, double word 1415 is generated by encapsulation logic 1222, but in other implementations some or all of double word 1415 is generated by other components of interconnection controller 230 (e.g., by another part of the link-layer logic of interconnection controller 230).

In this example, double word 1415 includes a packet header, CRC check data and a sequence identifier, all of which apply only to HSL packet 1224. Among other things, the header preferably indicates the type of packet in the payload and the packet length. The sequence identifier may be part of the header and is preferably correlated with a buffer space and a range of buffer indices of history buffer 1225.

Serializer/deserializer 313 converts the 8-bit symbols in each data lane into 10-bit symbols and serializes the data for transmission on inter-cluster link 1425. Other embodiments implement different conversions, e.g., of 4b/5b conversion. Moreover, the serializer and corresponding deserializer may be separate components. The conversions are made according to a unique one-to-one mapping, to allow accurate conversion back into 8-bit symbols at the receiving end.

The 8b/10b conversion allows clock information to be embedded in the HSL packets. Because the HSL packets are serialized, there is no longer a CLK signal that arrives (theoretically, at least) in parallel with words of the CAD signal. As is known to those of skill in the art, if there are at least 2 transitions from 1 to 0 (or vice versa) in each symbol, the individual data lines can be kept synchronized. In order to ensure that there are at least 2 transitions in each symbol, each 8-bit data symbol is converted to a unique 10-bit symbol (and later converted back to the original 8-bit symbol) according to a predetermined mapping. The mapping may be performed according to data stored in, for example, look-up tables available to the home and remote interconnection controllers. This mapping may be performed in a manner analogous to other industry standard 8b/10b mappings, e.g., Fibre Channel, Gigabit Ethernet, etc. The paper by A. X. Widmer and P. A. Franaszek entitled "A DC-Balanced, Partitioned-Block, 8B/10B Transmission Code" (IBM J. Res. Develop, 27(5), pp. 440–451, September 1983) is hereby incorporated by reference for all purposes.

In order to avoid bottlenecks, data should be sent between the home interconnection controller and the remote interconnection controller at a rate that matches the rate at which data are arriving at the home interconnection controller. This bandwidth matching is complicated by at least two factors. First of all, the data are arriving in "parallel" on a link having a certain number of data lanes and then are being serialized for transmission on another link that may have a different number of data lanes. In the example described above, intra-cluster link 1007 is a 19-bit-wide link that includes 16 data lanes 1006 for CAD signals, two data lanes for CLK signals and 1 data lane for the CNTL signal. Inter-cluster link 1325 has 12 data lanes. The inter-cluster link does not reserve data lanes for CLK and CNTL signals, but instead encodes this information in the serialized packet.

The 8b/10b (or other) conversion creates another complication for bandwidth matching: the conversion causes more data to be sent across inter-switch link 1325 than are arriving at serializer 1310. The 8b/10b conversion of this example causes 25% more data to be output than are input to serializer/deserializer 313.

In this example, data are arriving on intra-cluster link 1007 at a rate of 25.6 Gb/sec, so data should arrive at inter-cluster link 1425 at a corresponding rate. Accordingly, asynchronous FIFO 1410 should be supplying data on each of the 12 outgoing data paths at a rate of at least 2.13 Gb/sec. After serializer/deserializer 313 performs the 8b/10b conversion, data should travel on each lane of inter-cluster link 1425 at a rate of at least 2.67 Gb/sec, for a combined rate of 32 Gb/sec. Corresponding data rates apply to the remote interconnection controller that receives the HSL packets.

Figure 15:
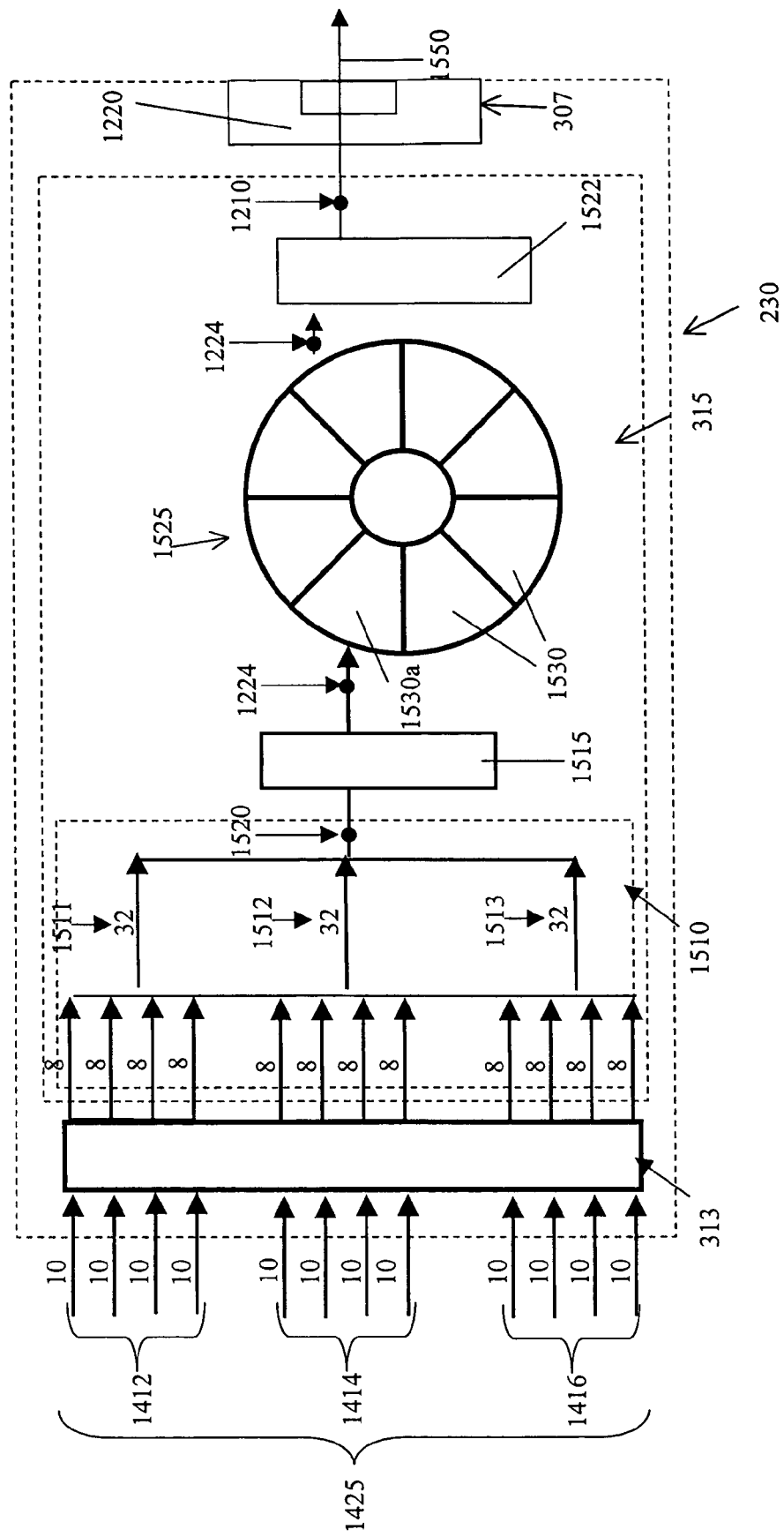
FIG. 15 illustrates a method of deserializing packets after transmission on an inter-cluster link.

FIG. 15 depicts remote interconnection controller 1550 for processing HSL packets after receipt via an inter-cluster link. In preferred embodiments of the invention, home interconnection controller 230 and remote interconnection controller 1550 have substantially the same components. According to some such embodiments, serializer/deserializer 313, asynchronous FIFO 1510, CRC checking logic 1515, buffer 1525 and decapsulation logic 1522 of remote interconnection controller 1550 correspond to serializer/deserializer 313, asynchronous FIFO 1410, CRC generating logic 1405, history buffer 1225 and encapsulation logic 1222 of home interconnection controller 230.

In this example, serializer/deserializer 313 deserializes the incoming HSL packets and converts the 10-bit symbols in each data lane of inter-cluster link 1425 into 8-bit symbols. As the data are converted, the clock signal of the 10b encoding is recovered and is correlated with each resulting 8-bit symbol. As noted above, other embodiments of serializer/deserializer 313 implement different conversions, e.g., 5b/4b conversion.

In this implementation, asynchronous FIFO 1510 forms the 8-bit symbols on each data lane of group 1412 into 32-bit double word 1511. Double word 1512 is formed from the 8-bit symbols of group 1414 and double word 1513 is formed from the 8-bit symbols of group 1416 in the same fashion. Asynchronous FIFO 1510 performs a de-skewing operation described below, if required, forms double words 1511, 1512 and 1513 into packet 1520 and sends HSL packet 1520 to CRC checking logic 1515. CRC checking logic 1515 recomputes a CRC value and compares it with the CRC data encoded in HSL packet 1520. If double words 1511, 1512 and 1513 are error-free, HSL packet 1520 corresponds with transmitted HSL packet 1224, which is written to buffer space 1530a of buffer 1525.

HSL packet 1224 is received from CRC checking logic 1515 (or from buffer 1525) by decapsulation logic 1522, where HSL packet 1224 is decapsulated into an intra-cluster protocol. In this example, HSL packet 1224 is decapsulated into HT protocol. Then, HT control packet 1210 is forwarded to intra-cluster interface circuitry 1220 of coherent interface 307 for transmission on intra-cluster link 1550.

If there were no skew in inter-cluster link 1325 and no errors in the transmission, packet 1520 would be identical to HSL packet 1224. In reality, inter-cluster link 1325 will normally have some amount of skew between the data lanes that must be detected and corrected before control packet 1210 can accurately be reproduced.

As noted above, multi-bit skews cannot readily be detected or deciphered when transmitting packets according to HT protocol. However, the implementations of the present invention for inter-cluster communication facilitate skew detection and correction. First of all, a CLK signal has been encoded in each data lane by way of the 8b/10b (or other) encoding, so there is no issue of skew with respect to the CLK signal. Instead, the encoded clock signal allows the data in each lane to be accurately matched with the corresponding CLK signal. Second, the initialization process for inter-cluster links described above reveals the skew pattern characteristic between data lanes of each inter-cluster link.

Figure 16:
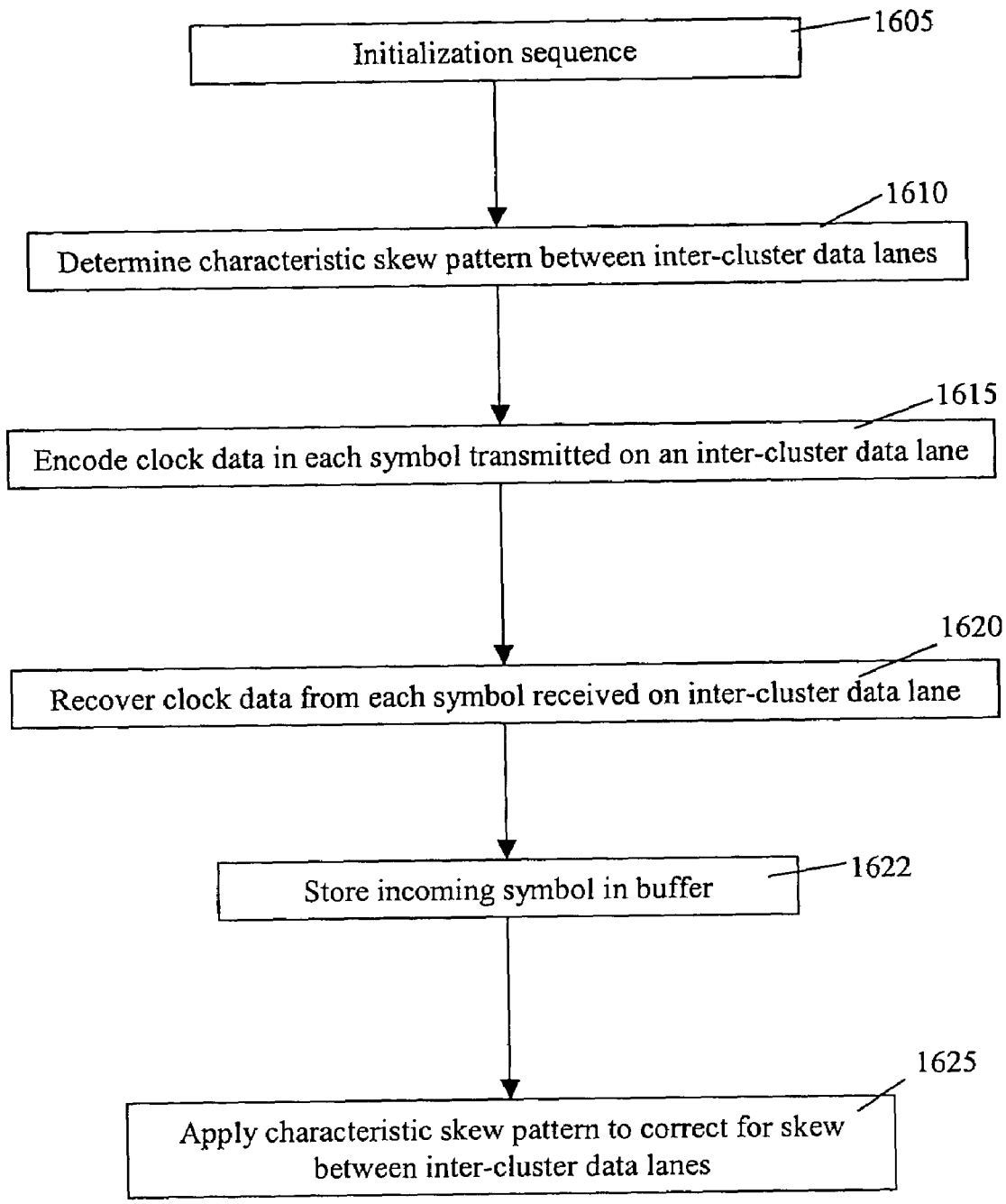
FIG. 16 is a flow chart that outlines a method of detecting and correcting skew according to some implementations of the invention.

FIG. 16 depicts a process for detecting and eliminating skew according to some implementations of the invention. In step 1605, an inter-cluster initialization sequence is performed. The inter-cluster initialization sequence may include, for example, the use of one or more training sequences having known structures and lengths. These training sequences may be novel or may be analogous to training sequences employed in other contexts, such as, for example, TS1 and TS2 of the InfiniBand™ protocol. The InfiniBand Architecture Release 1.1, dated Nov. 6, 2002, particularly Section 5.6.1, "Link De-Skew and Training Sequence," is hereby incorporated by reference. The training sequences may be repeated on each data lane of the inter-cluster link until all data lanes are synchronized, e.g., until a phase-lock loop ("PLL") is established for the transmitting and receiving interconnection controllers on each data lane of the inter-cluster link.

In step 1610, after all data lanes are individually synchronized, a characteristic inter-lane skew pattern will emerge. This skew pattern may be correlated with buffer indices of the interconnection controllers. For example, on each data lane a buffer index may be correlated with a "start" symbol of the training sequence. After the inter-lane skew pattern is established, it is stored into memory and later used to de-skew packets received in the inter-cluster links.

In step 1615, clock data are encoded in each symbol transmitted on each data lane of the inter-cluster link. This encoding step may be performed, for example, when serializer/deserializer 313 of home interconnection controller 230 encodes 8-bit symbols as 10-bit symbols, as described above. The transitions in the 10-bit symbols keep the PLL of each bit lane locked.

In step 1620, the clock data are recovered when symbols are received by a remote interconnection controller. For example, step 1620 may involve recovering the clock signal from the 10b encoding as 10-bit symbols are converted to 8-bit symbols. This step may be performed by converter 1510. Step 1620 ensures that clock signals are accurately associated with each resulting 8-bit symbol. In step 1622, the incoming symbols are stored in a buffer.

In step 1625, the characteristic skew pattern established during the initialization process is employed to correct any skew that may exist between data lanes. Step 1625 is preferably performed after packets are written to buffer 1525, so that bits of preceding or following packets may be used in the de-skewing process. The corresponding buffer indices of buffer 1525, as established by the skew pattern that was determined during the initialization process, are correlated in order to reconstruct the original packet (here, control packet 1210).

After a received packet has been reconstructed and de-skewed, a CRC check is performed, based only on that packet. This CRC check is compared with the CRC check information encoded in the packet to check the packet for errors. If the packet is error-free, remote interconnection controller 1550 subsequently sends an ACK packet to home interconnection controller 230. Such an ACK packet may be of the type illustrated in FIG. 13J. The ACK packet is preferably encapsulated with another packet within a link-layer HSL packet. For example, the ACK packet may be encapsulated so as to "piggy back" with a 32-bit control packet within a link-layer HSL packet, as depicted in FIG. 13A. The ACK packet preferably applies to a range of packets, e.g., by indicating the sequence identifier of the last error-free packet received. Alternative embodiments, wherein an ACK is sent regarding every packet are not, as efficient in terms of system performance.

As noted above, according to preferred implementations of the invention, a copy of the packet is retained in history buffer 1225 of home interconnection controller 230 until an ACK is received indicating that a transmitted packet (or a group of packets including the transmitted packet) was received without errors. The sequence identifier in the ACK packet allows the buffer spaces 1230 and indices corresponding to the transmitted packet (or group of transmitted packets) to be identified and purged after the ACK is received. In some embodiments, the buffer spaces in which all previously-transmitted packets are stored are also purged at this time.

According to some implementations of the invention, after a predetermined number of packets has been transmitted by home interconnection controller 230 without receiving an ACK, home interconnection controller 230 stops transmitting inter-cluster packets until an ACK is received. In some implementations, the predetermined number is based on the size of history buffer 1225.

If any of double words 1511, 1512 and 1513 are not error-free (e.g., if the 10b/8b conversion results in an invalid value), remote interconnection controller 1550 notifies home interconnection controller 230 of the error. Remote interconnection controller 1550 also notifies home interconnection controller 230 if there is a gap in the sequence ID of received packets.

According to some implementations, remote interconnection controller 1550 initiates a retry sequence after an error is detected. The retry sequence preferably provides a one-time, error-free delivery of protocol layer packets. Preferably, the packets are treated as indivisible units and identified by sequence numbers. As noted above, encoding and computing CRC data on a per-packet basis allows for error detection and isolation at the packet boundary. Preferably, the retry sequence allows for multiple errors in the same packet, e.g., in the link layer, the physical layer, in different fields of the same layer, etc. Moreover, the retry mechanism preferably includes an integrated recovery mechanism for errors in the physical and link layers and a packet identifier for the last error-free reception exchanged. Preferred implementations include a re-transmission of transmitted, but not received packets from a history buffer. Finally, the retry sequence includes resumption of the normal protocol layer packet transmission.

Retry Upon Error Detection

Each packet transfer is complete when all fields of the packet are received. The transfer may be determined to be error-free if, e.g., all fields are found to be error-free. For example, a packet may be considered error-free if the sequence ID of the packet is correct, the encoded CRC value is compared with a re-computed value, and no PHY layer errors in symbol transmissions are observed. If a data packet is large enough to require multiple transfers, all transfers on multiple cycles must normally be received in order to determine whether the packet has been received without errors, because in preferred implementations the last transfer contains the CRC data. Once a packet is received without any errors, its sequence identifier is noted as the last good sequence identifier to be sent in the next ACK packet.

However, even during the normal flow of packets, PHY and/or link layer errors can occur. For example, if an acknowledgement packet is not received after a predetermined time after a packet has been sent, then ACK time out error can occur. Alternatively, the encoded CRC value may not match a re-computed CRC value. According to preferred embodiments, any such error forces the link on which the packet was sent to be shut down (logically).

Once the link is down due to error, the PHY layers re-connect to each other through an initialization sequence. Once this PHY link up is achieved, the last good reception of packets at each interconnection controller is conveyed to the other interconnection controller using ACK packets.

When the first ACK packet is received by an interconnection controller, the history buffer is checked for any packets beyond the acknowledged packet which need acknowledgement. These packets are re-transmitted (without being purged from the history buffer). According to preferred implementations, as soon as the last packet from the history buffer is re-transmitted, any protocol layer packet from the interconnection controller core can be transmitted. This ordering of transmission and re-transmission ensures the ordering of packets within each virtual channel.

The history buffer also preferably maintains any credits sent across the link. Thus, no credits are lost due to link errors. However, no acknowledgement packets should be stored in the history buffer, in order to ensure that no false acknowledgements are sent upon re-transmission of packets from the history buffer.

Coming Out of Reset

When local and remote interconnection controllers come out of reset, the physical (PHY) layers link up. The PHY layer link up is achieved using multiple steps in the initialization sequence, such as: lock the receiver phase lock loops; de-skew all bit lanes; de-code incoming data; and deliver the decoded data to the receiving interconnection controller.

After the PHY layer linkup, the link layers exchange the sequence ID of the last good packet received. According to some implementations, the default sequence ID is the maximum index of the history buffer. Coming out of reset, this sequence ID is exchanged, as a part of an ACK packet. When the ACK packet is received, the corresponding interconnection controller (e.g., a local interconnection controller) starts sends the credit packets to the other interconnection controller (e.g., a remote interconnection controller). Using these credits, the remote interconnection controller can then send protocol layer packets.

Thus, from the cycle in which the link was brought down to the cycle in which the last packet is re-transmitted from the history buffer, no protocol layer packet from the interconnection controller core is picked up for transmission. However, the interconnection controller (and the rest of the system) remains un-affected by this retry mechanism, except for the back pressure on the transfer of packets across the affected link. After the completion of the re-transmission from the history buffer, the normal flow of packet transfer from one interconnection controller to another continues.

The mechanism is robust enough to tolerate multiple errors during this sequence. Each error brings the PHY layer down, and restarts the retry mechanism.

In one such implementation, the retry sequence is initiated when the physical layer of the remote interconnection controller indicates to the link layer that the link is down. (The electrical connection between the physical layers of the home and remote interconnection controllers does not need to actually go down.) The sequence can be initiated by transmitting a signal at the physical layer, e.g., a comma character.

According to alternative implementations, remote interconnection controller 1550 sends a "NACK" or "RETRY" packet to home interconnection controller 230. Such a packet may identify, for example, the sequence number of the first packet with an error (or the first packet in a sequence identifier number gap.

While the invention has been particularly shown and described with reference to specific embodiments thereof, it will be understood by those skilled in the art that changes in the form and details of the disclosed embodiments may be made without departing from the spirit or scope of the invention. For example, specific embodiments have been described herein with reference to a particular multi-processor architecture having a limited node ID space and flat request mapping functions. It will be understood, however, that the present invention applies more generally to a wide variety of multi-processor architectures that employ a point-to-point communication infrastructure to facilitate communication among the various nodes in the system. In addition, each of the various aspects of the embodiments described herein relating to, for example, address mapping, routing mechanisms, and transaction identification, may be used in combination with various alternatives of other ones of these aspects without departing from the scope of the invention.

It should also be understood that the various embodiments of the invention may be implemented or represented in a wide variety of ways without departing from the scope of the invention. That is, for example, the interconnection controller described herein may be represented (without limitation) in software (object code or machine code), in varying stages of compilation, as one or more netlists, in a simulation language, in a hardware description language, by a set of semiconductor processing masks, and as partially or completely realized semiconductor devices. The various alternatives for each of the foregoing as understood by those of skill in the art are also within the scope of the invention. For example, the various types of computer-readable media, software languages (e.g., Verilog, VHDL), simulatable representations (e.g., SPICE netlist), semiconductor processes (e.g., CMOS), and device types (e.g., ASICs) suitable for designing and manufacturing the processes and circuits described herein are within the scope of the invention.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

We claim:

1. A computer system comprising a plurality of processor clusters interconnected by a plurality of point-to-point inter-cluster links, each processor cluster comprising nodes including:
   a plurality of local processors; and
   an interconnection controller;
      wherein the nodes are interconnected by a plurality of point-to-point intra-cluster links,
      wherein communications within a cluster are made via an intra-cluster protocol that uses intra-cluster packets,
      wherein the interconnection controller in each cluster is operable to map locally-generated communications directed to others of the clusters to the point-to-point inter-cluster links and to map remotely-generated communications directed to the local nodes to the point-to-point intra-cluster links,
      wherein communications between clusters are made via an inter-cluster protocol that uses inter-cluster packets, an inter-cluster packet encapsulating at least one intra-cluster packet, and
      wherein each interconnection controller is configured to compute a first cyclic redundancy code check for, and to encode first cyclic redundancy code check data in, each inter-cluster packet transmitted on the point-to-point inter-cluster links.

2. The computer system of claim 1, wherein each interconnection controller is further configured to compute a second cyclic redundancy code check for each inter-cluster packet received on the point-to-point inter-cluster links.

3. The computer system of claim 1, wherein each interconnection controller is further configured to transmit each inter-cluster packet as an indivisible unit on the point-to-point inter-cluster links.

4. The computer system of claim 1, wherein each interconnection controller is further configured to encode a sequence identifier in each inter-cluster packet transmitted on the point-to-point inter-cluster links.

5. The computer system of claim 1, wherein the nodes are configured to compute a cyclic redundancy code check on a transmission window that includes transmissions of multiple intra-cluster packets on the point-to-point intra-cluster links.

6. The computer system of claim 1, wherein each interconnection controller is further configured to compute a cyclic redundancy code check on a transmission window that includes transmissions of multiple intra-cluster packets on the point-to-point intra-cluster links.

7. The computer system of claim 1, wherein each interconnection controller encodes the cyclic redundancy code check data in a field reserved for a link layer of each inter-cluster packet transmitted on the point-to-point inter-cluster links.

8. A computer system, comprising:
   a first cluster including a first plurality of processors and a first interconnection controller, the first plurality of processors and the first interconnection controller interconnected by first point-to-point intra-cluster links; and
   a second cluster including a second plurality of processors and a second interconnection controller, the second plurality of processors and the second interconnection controller interconnected by second point-to-point intra-cluster links, the first interconnection controller coupled to the second interconnection controller by point-to-point inter-cluster links;
   wherein the first interconnection controller is configured to:
      receive a request according to an intra-cluster protocol from a first processor in the first plurality of processors;
      generate a probe packet responsive to the request;
      compute a first cyclic redundancy code check based only upon bits in the probe packet;
      encode first cyclic redundancy code check data in the probe packet; and
      send the probe packet to the second interconnection controller in the second cluster.

9. The computer system of claim 8, wherein the first interconnection controller is further configured to encode a sequence identifier in the probe packet.

10. The computer system of claim 8, wherein the second interconnection controller is configured to compute a second cyclic redundancy code check based only upon bits in the first probe packet.

11. The computer system of claim 8, wherein the second interconnection controller is configured to forward the probe packet according to the intra-cluster protocol to a processor in the second plurality of processors.

12. The computer system of claim 8, wherein the second interconnection controller is configured to forward the probe packet according to the intra-cluster protocol to each processor in the second plurality of processors.

13. The computer system of claim 11, wherein the processor in the second plurality of processors is configured to send a response packet according to the intra-cluster protocol to the second interconnection controller.

14. The computer system of claim 12, wherein each processor in the second plurality of processors is configured to send a response packet according to the intra-cluster protocol to the second interconnection controller.

15. An interconnection controller, comprising:
   an intra-cluster interface configured for coupling with intra-cluster links to a plurality of local processors arranged in a point-to-point architecture in a local cluster;
   an inter-cluster interface configured for coupling with an inter-cluster link to a non-local interconnection controller in a non-local cluster;
   a transceiver configured to receive an intra-cluster packet from a local processor via an intra-cluster link and encode a sequence identifier in a header of the intra-cluster packet; and a serializer/deserializer configured to serialize the encoded packet and forward the encoded, serialized packet to the inter-cluster interface for transmission to the non-local interconnection controller via an inter-cluster link.

16. The interconnection controller of claim 15, wherein the transceiver is further configured to compute a cyclic redundancy code check based only on the encoded packet and to encode the cyclic redundancy code check in the encoded packet.

17. The interconnection controller of claim 15, wherein the inter-cluster interface is further configured to receive encoded, serialized packets from the non-local interconnection controller, wherein the serializer/deserializer is further configured to deserialize the encoded, serialized packets and wherein the transceiver is further configured to perform a cyclic redundancy code check on the deserialized packets.

18. An integrated circuit comprising the interconnection controller of claim 15.

19. A set of semiconductor processing masks representative of at least a portion of the interconnection controller of claim 15.

20. At least one computer-readable medium having data structures stored therein representative of the interconnection controller of claim 15.

21. The integrated circuit of claim 18, wherein the integrated circuit comprises an application-specific integrated circuit.

22. The at least one computer-readable medium of claim 20, wherein the data structures comprise a simulatable representation of the interconnection controller.

23. The at least one computer-readable medium of claim 20, wherein the data structures comprise a code description of the interconnection controller.

24. The at least one computer-readable medium of claim 22, wherein the simulatable representation comprises a netlist.

25. The at least one computer-readable medium of claim 23, wherein the code description corresponds to a hardware description language.

26. A computer-implemented method for detecting errors in a computer system comprising a plurality of clusters, each cluster including a plurality of local nodes and an interconnection controller interconnected by point-to-point intra-cluster links, communications between the local nodes and the interconnection controller made via an intra-cluster protocol using intra-cluster packets, the interconnection controller of each cluster interconnected by point-to-point inter-cluster links with the interconnection controller of other clusters, the computer-implemented method comprising:

forming an inter-cluster packet by encapsulating an intra-cluster packet;

encoding a sequence identifier in the inter-cluster packet;

calculating first cyclic redundancy code check data based only upon the inter-cluster packet;

encoding the first cyclic redundancy code check data in the inter-cluster packet; and transmitting the inter-cluster packet from a first interconnection controller to a second interconnection controller on a point-to-point inter-cluster link.

27. The computer-implemented method of claim 26, wherein the encoding steps comprise encoding in an area of the inter-cluster packet reserved for link layer information.

28. The computer-implemented method of claim 26, further comprising:

receiving the inter-cluster packet; and calculating second cyclic redundancy code check data based only upon the inter-cluster packet.

29. The computer-implemented method of claim 28, further comprising:

detecting an error in the inter-cluster packet based upon the second cyclic redundancy code check data; and notifying the first interconnection controller of the error.

30. An apparatus for detecting errors in a computer system comprising a plurality of clusters, each cluster including a plurality of local nodes and an interconnection controller interconnected by point-to-point intra-cluster links, communications between the local nodes and the interconnection controller made via an intra-cluster protocol using intra-cluster packets, the interconnection controller of each cluster interconnected by point-to-point inter-cluster links with the interconnection controller of other clusters, the apparatus comprising:

means for forming an inter-cluster packet by encapsulating an intra-cluster packet;

means for encoding a sequence identifier in the inter-cluster packet;

means for calculating first cyclic redundancy code check data based only upon the inter-cluster packet;

means for encoding the first cyclic redundancy code check data in the inter-cluster packet; and means for transmitting the inter-cluster packet from a first interconnection controller to a second interconnection controller on a point-to-point inter-cluster link, wherein the encoding means comprise means for encoding in an area of the inter-cluster packet reserved for link layer information.

* * * * *